United States Patent
Graves et al.

(10) Patent No.: US 7,083,084 B2
(45) Date of Patent: *Aug. 1, 2006

(54) SYSTEM AND METHOD FOR MANAGING STORED-VALUE CARD DATA

(75) Inventors: Phillip Craig Graves, Atlanta, GA (US); Merrill Brooks Smith, Atlanta, GA (US)

(73) Assignee: e2interactive, Inc., Atlanta, GA (US)

( * ) Notice: Subject to any disclaimer, the term of this patent is extended or adjusted under 35 U.S.C. 154(b) by 123 days.

This patent is subject to a terminal disclaimer.

(21) Appl. No.: 10/411,971

(22) Filed: Apr. 11, 2003

(65) Prior Publication Data

US 2003/0205616 A1 Nov. 6, 2003

Related U.S. Application Data

(63) Continuation of application No. 09/641,363, filed on Aug. 18, 2000, now Pat. No. 6,575,361.
(60) Provisional application No. 60/149,740, filed on Aug. 19, 1999.

(51) Int. Cl.
    *G06F 17/60* (2006.01)

(52) U.S. Cl. .............. 235/379; 235/380; 235/385; 705/39; 705/40; 705/44; 705/77
(58) Field of Classification Search .......... 235/379, 235/380, 385, 381; 705/39, 40, 41, 77, 44
See application file for complete search history.

(56) References Cited

U.S. PATENT DOCUMENTS

| | | | | |
|---|---|---|---|---|
| 5,577,109 | A | * | 11/1996 | Stimson et al. .......... 379/114.2 |
| 5,918,909 | A | | 7/1999 | Fiala et al. |
| 6,000,608 | A | * | 12/1999 | Dorf ......................... 235/380 |
| 6,185,545 | B1 | | 2/2001 | Resnick et al. |
| 6,189,787 | B1 | * | 2/2001 | Dorf ......................... 235/380 |
| 6,208,851 | B1 | * | 3/2001 | Hanson ..................... 455/405 |
| 6,270,012 | B1 | * | 8/2001 | Dawson ..................... 235/381 |
| 6,282,566 | B1 | * | 8/2001 | Lee et al. .................. 709/217 |
| 6,285,749 | B1 | | 9/2001 | Manto |
| 6,314,171 | B1 | | 11/2001 | Dowens |
| 6,315,206 | B1 | | 11/2001 | Hansen et al. |
| 6,333,976 | B1 | * | 12/2001 | Lesley .................. 379/114.01 |
| 6,375,073 | B1 | | 4/2002 | Aebi et al. |
| 6,424,706 | B1 | * | 7/2002 | Katz et al. ............. 379/144.01 |
| 6,434,379 | B1 | | 8/2002 | Despres et al. |
| 6,445,780 | B1 | * | 9/2002 | Rosset et al. .......... 379/114.17 |

(Continued)

*Primary Examiner*—Jared J. Fureman
*Assistant Examiner*—Allyson N Trail
(74) *Attorney, Agent, or Firm*—Hunton & Williams

(57) ABSTRACT

A computerized system and method for managing stored-value card data over a communications network between a plurality of terminals and a central processor is provided. Each of the terminals is accessible to respective users and is located in a respective location generally remote relative to the central processor. The stored-value card data is configured to securely process in real time stored-value cards transacted by respective users to enable charging prepaid stored-value services to a recipient of the transacted stored-value card. The method allows for providing a database coupled to the central processor. The method further allows for storing in the database a plurality of records comprising stored-value card data for each stored-value card. An associating step allows for associating in each stored record respective identifiers to uniquely match a respective stored-value card and a respective terminal. The associating step is enabled by assigning a "setup" card to the location and capturing the terminal information when a transaction utilizing that card is made. A transmitting step allows for transmitting a request of stored-value card activation to the central processor from a respective requesting terminal, the central processor configured to accept said activation request based on whether the associated identifiers for the stored-value card to be activated match identifiers actually transmitted by the requesting terminal for that stored-value card and terminal.

33 Claims, 5 Drawing Sheets

U.S. PATENT DOCUMENTS

| | | |
|---|---|---|
| 6,588,658 B1 | 7/2003 | Blank |
| 6,592,035 B1 | 7/2003 | Mandile |
| 6,745,022 B1 | 6/2004 | Knox |
| 2001/0023415 A1 | 9/2001 | Keil |
| 2002/0077076 A1 | 6/2002 | Suryanarayana et al. |
| 2002/0101966 A1 | 8/2002 | Nelson |
| 2002/0115424 A1 | 8/2002 | Bagoren et al. |
| 2002/0119767 A1 | 8/2002 | Fieldhouse et al. |
| 2002/0133457 A1 | 9/2002 | Gerlach et al. |
| 2003/0194988 A1 | 10/2003 | Knox |

* cited by examiner

US 7,083,084 B2

SYSTEM AND METHOD FOR MANAGING STORED-VALUE CARD DATA

CROSS-REFERENCE TO RELATED APPLICATIONS

This application is a continuation of U.S. application Ser. No. 09/641,363, filed Aug. 18, 2000 now U.S. Pat. No. 6,575,361. This application claims the benefit of U.S. Provisional Application No. 60/149,740, filed Aug. 19, 1999.

A portion of the disclosure of this patent document includes material which is subject to copyright protection. The copyright owner has no objection to the facsimile reproduction by anyone of the patent document or the patent disclosure, as it appears in the Patent and Trademark Office Patent File or records, but otherwise reserves all copyrights rights whatsoever.

BACKGROUND OF THE INVENTION

The present invention is generally related to remote data management, and, more particularly, the present invention is related to system and method for managing stored-value card data between a plurality of users and a central processor over a communications network. The stored-value card data is indicative of services and/or products prepaid by the owner or end user of the card. Examples of prepaid services that may be accommodated by the stored-value data include long distance telephone communication, wireless communication, paging and internet-enabled communication services, including wireless Web access. Other examples of prepaid services and/or products that may be accommodated by the stored-value card may also include gift cards, prepaid gas cards, prepaid grocery cards, prepaid entertainment cards, customer rewards cards and any other type of stored-value cards for products, services, or both, that may be prepaid by the owner of the card.

Prepaid long distance phone cards are generally used in the telephone industry to allow customers to prepurchase long distance calling time. Such cards are typically purchased in a predefined value. The card provides the customer with an amount of long distance calling time equal to the predefined value. The wireless, paging and internet cards are used to allow the customer to pre-purchase these services. Gift cards and other representations of stored-value cards allow the end-user to prepay for goods and/or services. The value is redeemed as these goods and/or services are delivered.

Each of the cards has an identification number printed and which identification could be magnetically stored therein. The identification number is also stored in a file in a database maintained by the card issuer. This file also stores the predefined value of the card. In the traditional business model, when the cards are sent to the retail location from which they will be sold the corresponding records in the database are activated, thus allowing the card to be used immediately by a customer. To use the card as a prepaid long distance card, the customer dials a toll free number to access the card issuer's system, enters the identification number, and then makes the desired long-distance call. During the call, the value of the card in the database is reduced as a function of phone charges accumulated during that call. When the value of the card is exhausted, the call terminates. If the customer ends the call before the value of the card is exhausted, the remaining value may be used for additional calls. Once the entire value of the card has been used, the card is discarded.

These prior art prepaid phone card systems have several disadvantages. For example, since the cards are active while on the shelf in the retail location, the cards may be stolen by a thief and easily used. One way to address some of the drawbacks of prior art prepaid phone card systems would be to install activation terminals unique to the prepaid card issuer. This is referred to as a "closed system." U.S. Pat. No. 5,577,109 by Stimson et al. discloses such a closed system. In the Stimson system, the cards are not preactivated. Each of the retail locations from which cards are to be sold is provided with a dedicated activation terminal which allows the retail operator to set the value of the card at the time of the sale. The activation terminal connects to the card issuer's system to pass along the value amount and to request activation of the card. Depleted cards can be recharged in the same manner as they are sold. A serious disadvantage of the Stimson system is that it requires single-function dedicated hardware to be installed in each retail location, resulting in a very inflexible and expensive system.

US. Pat. No. 6,000,608 by Dorf provides a multifunction card system including a prepaid phone card activating system which allows cards to be purchased in varying amounts and to be recharged without requiring the use of a closed system to handle the transactions. Although Dorf purports to alleviate some of the drawbacks of Stimson by using point-of-sale devices connected to a banking system, it is believed that Dorf fails to associate in the record of the phone card identifiers that uniquely match a respective phone card and a respective terminal so as to enhance detection of potential security breaches that could ensue in any system accessible to a large number of users. It would be further desirable to provide a system that allows for selectively processing stored-value card requests, such as stored-value card activation, deactivation, and/or incrementing, based on a table of predefined codes associated with respective user groups.

BRIEF SUMMARY OF THE INVENTION

Generally speaking, the foregoing needs are fulfilled by providing in one exemplary embodiment a computerized method for managing stored-value card data over a communications network between a plurality of terminals and a central processor. Each of the terminals is accessible to respective users and is located in a respective location generally remote relative to the central processor. The stored-value card data is configured to securely process in real time stored-value cards transacted by respective users to enable charging prepaid stored-value services and/or products to a recipient of the transacted stored-value card. The method allows for providing a database coupled to the central processor. The method further allows for storing in the database a plurality of records comprising stored-value card data for each stored-value card. A processing step allows for processing a "setup" card assigned to that location through each terminal at that location to capture respective identifiers of each terminal, e.g., terminal electronic signature. An associating step allows for associating in each stored record the captured identifiers to uniquely match a respective stored-value card and a respective terminal. A transmitting step allows for transmitting a request of stored-value card activation to the central processor from a respective requesting terminal, the central processor configured to accept said activation request based on whether the associated identifiers for the stored-value card to be activated match identifiers actually transmitted by the requesting terminal for that stored-value card and terminal.

In another aspect thereof, the present invention further fulfills the foregoing needs by providing in another exemplary embodiment a computer-readable medium encoded with computer program code for managing stored-value card data over a communications network between a plurality of terminals and a central processor. Each of the terminals is accessible to respective users and located in a respective location generally remote relative to the central processor. The stored-value card data is configured to securely process in real time stored-value cards transacted by respective users to enable charging prepaid services and/or products to a recipient of the transacted stored-value card. The program code causes a computer to execute the following actions:

controlling a database coupled to the central processor;

storing in the database a plurality of records comprising stored-value card data for each stored-value card;

associating in each stored record respective identifiers to uniquely match a respective stored-value card and a respective terminal;

defining in each stored record a parameter corresponding to the face value of each respective stored-value card; and processing a request of stored-value card activation to the central processor from a respective requesting terminal, the central processor configured to accept said activation request based on whether the associated identifiers for the stored-value card to be activated match identifiers actually transmitted by the requesting terminal for that stored-value card and terminal.

In yet another aspect thereof, the present invention fulfills the foregoing needs by providing a system for managing stored-value card data over a communications network between a plurality of terminals and a central processor. Each of the terminals is accessible to respective users and located in a respective location generally remote relative to the central processor. The stored-value card data is configured to securely process in real time stored-value cards transacted by respective users to enable charging prepaid services and/or products to a recipient of the transacted phone card. The system in one exemplary embodiment comprises a database coupled to the central processor. A storage control module is configured to store in the database a plurality of records comprising stored-value card data for each stored-value card. An associating module is configured to associate in each stored record respective identifiers to uniquely match a respective stored-value card and a respective terminal. A value module is configured to define in each stored record a parameter corresponding to the face value of each respective stored-value card. A first processing module is configured to process a request of stored-value card activation to the central processor from a respective requesting terminal. The central processor is configured to accept said activation request based on whether the associated identifiers for the stored-value card to be activated match identifiers actually transmitted by the requesting terminal for that stored-value card and terminal and wherein the request for stored-value card activation enables to associate a value for the card to be activated solely based on the parameter corresponding to the face value for that card. A second processing module is configured to process a request for incrementing the value associated with a respective stored-value card. That request is transmitted to the central processor from a respective requesting terminal. The central processor is configured to accept that increment request based on whether the respective identifiers stored in the record for the stored-value card whose associated value is to be incremented match identifiers actually transmitted by the requesting terminal for that stored-value card and terminal and wherein the incrementing request is solely based on multiples of the parameter corresponding to the face value of that stored-value card.

Figure 1:
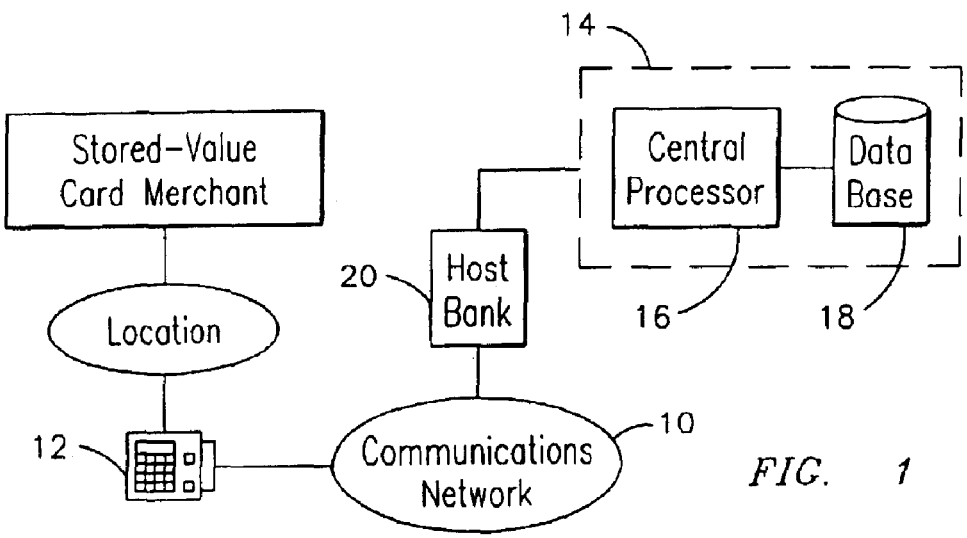
FIGS. 1–5 respectively illustrate schematic block diagrams showing various exemplary stored-value card user trees that as shown in FIGS. 1–3 may be connected via a communications network to a remote stored-value card data management system embodying the present invention.

Before any embodiment of the invention is explained in detail, it is to be understood that the invention is not limited in its application to the details of construction and the arrangements of components set forth in the following description or illustrated in the drawings. The invention is capable of other embodiments and of being practiced or being carried out in various ways. Also, it is to be understood that the phraseology and terminology used herein is for the purpose of description and should not be regarded as limiting.

DETAILED DESCRIPTION OF THE INVENTION

Glossary

Customer/Distributor. A customer/distributor is a customer of the assignee of the present invention who performs the role of distributor by managing a set of stored-value cards and subordinate entities that use the stored-value card data management system of the present invention.

Merchant. A merchant is a stored-value card-selling business unit or business chain that can be subordinate to other merchants, or have other merchants subordinate to it. An arbitrary number of hierarchy levels and branching complexity can be supported at the merchant level. In one illustrative embodiment, the database is implemented to support up to eight merchant levels in order to conveniently halt excessive tree recursion in the case of circular or lost dependencies. It will be appreciated, however, that each database element may be designed to permit the number of levels to be extended beyond eight by the change of a single parameter in any given element.

Location. A location is a business unit, typically a single physical store, subordinate to a single merchant, which owns one or more terminals. Setup cards associate authorized terminals with specific locations upon such cards being swiped at a designated terminal. Any authorized terminal at a location can activate any Fastcards$^{SM}$ stored-value card assigned to that location Locations do not necessarily identify unique geographic locations (although typically they do). However, setup cards uniquely identify locations.

Terminal. A terminal is a physical credit or debit-card terminal. A terminal is subordinate to one and only one location. A location can own one or more terminals.

Setup Cards. Setup cards include a unique encoded control number, but no denomination value, and are used to identify merchant locations with a set of stored-value cards to be activated, deactivated, or incremented. Once associated with a location, setup cards can identify and create authorized terminals via the credit or debit card-like data obtained from a swiping action through each respective terminal at the associated location. This process is used to capture identifiers, e.g., electronic signature of the terminal, that enable identification of terminals authorized to process stored-value cards assigned to that location, preventing unauthorized terminals from gaining access.

Standard Telecommnunications Cards. Standard telecommunications cards include a unique encoded control number, a value, and are only allowed to be activated by terminals at a particular location. Standard cards are available in currency or unit denominations. Standard cards are reported at the terminal level if activated via a swipe, or at an assigned location or merchant entity if activated over the web.

Prepaid Wireless cards. Prepaid wireless cards include a unique encoded control number, a value for wireless calling time, and are only allowed to be activated by terminals at a particular location. Prepaid Wireless cards arc available in currency or unit denominations. Prepaid Wireless cards are reported at the terminal level if activated via a swipe, or at an assigned location or merchant entity if activated over the web.

Prepaid Paging cards. Prepaid paging cards include a unique encoded control number, a value for paging units, and are only allowed to be activated by terminals at a particular location. Prepaid paging cards are available in currency or unit denominations. Prepaid paging cards are reported at the terminal level if activated via a swipe, or at an assigned location or merchant entity if activated over the web.

Prepaid Internet access cards. Prepaid Internet access cards include a unique encoded control number, a value for Internet access time, and are only allowed to be activated by terminals at a particular location. Prepaid Internet access cards are available in currency or unit denominations. Prepaid Internet access cards are reported at the terminal level if activated via a swipe, or at an assigned location or merchant entity if activated over the web.

Promotional Telecommunications Cards. Promotional telecommunications cards include a unique encoded control number, a value, and can be activated from any terminal by using a predefined denomination code, e.g., one cent. Promotional cards are available in currency or unit denominations. Promotional cards are not reported with any entity.

Gift Stored-value Cards. Gift stored-value cards include a unique encoded control number and value. Gift cards are available in currency or unit denominations.

Sales Stored-value Cards. Sales cards are like promotional cards in that they can be activated by any terminal. The distinction relative to promotional cards is that sales cards are reported at their respective owning entity.

Introduction

In one exemplary embodiment, the system for managing stored-value card data may interface with any of the above-identified entities, which form a set of trees, with one customer/distributor at a top layer, an intermediate layer of one or more merchants above a layer of locations. A bottom layer of terminals is below the layer of locations.

FIGS. 1–5 illustrate examples of entity trees that may benefit from the system and techniques of the present invention. For simplicity of illustration, the customer/distributor layer at the top is omitted. Each distributor can have subordinate to it any of the illustrated types of structures. Note that in each case, a merchant is at the top, with a layer of locations just above a layer of terminals.

The assignee of the present invention may issue from time to time prepaid stored-value cards that may carry information encoded on a magnetic stripe such as may be used in credit or debit card transactions. The stored-value card is analogous to a valid credit or debit card, with no monetary value until activated. As used herein, the term stored-value card refers to a medium, generally made of plastic or any other light and durable material and typically having a credit-card size that enables its owner or end user to obtain one or more prepaid stored-value services, products, or both, such as long distance telephone communication, wireless communication, paging, internet-enabled communication services, including wireless Web access, and any other stored-value of prepaid services and/or products that may be provided to end users of the card. Other examples of prepaid services and/or products that may be accommodated in the stored-value card may also include gift cards, prepaid gas cards, prepaid grocery cards, prepaid entertainment cards, customer rewards cards and any other type of stored-value cards for products, services, or both, that may be prepaid by the owner of the card.

Figure 2:
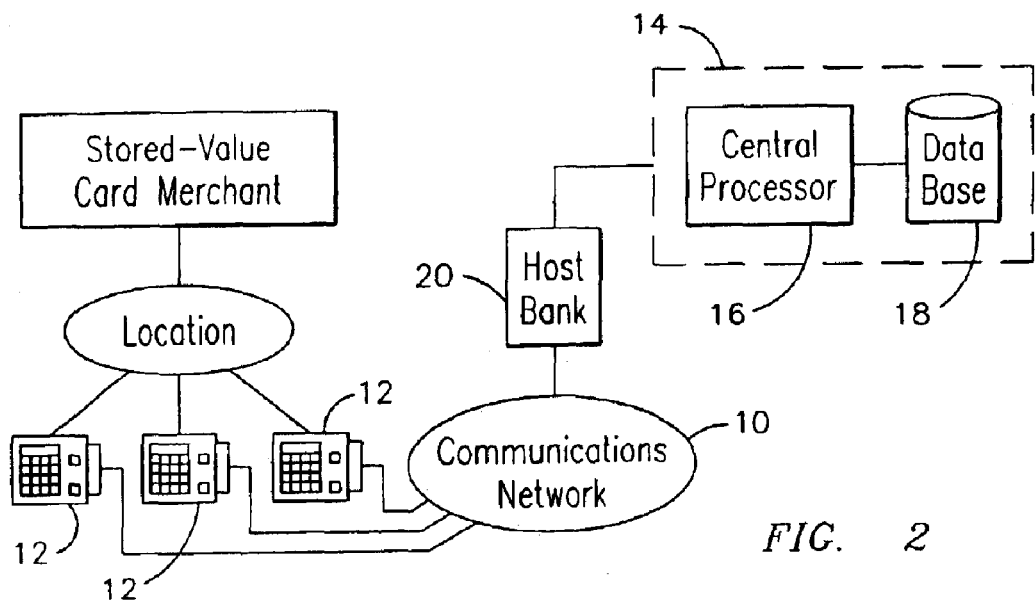
Figure 3:
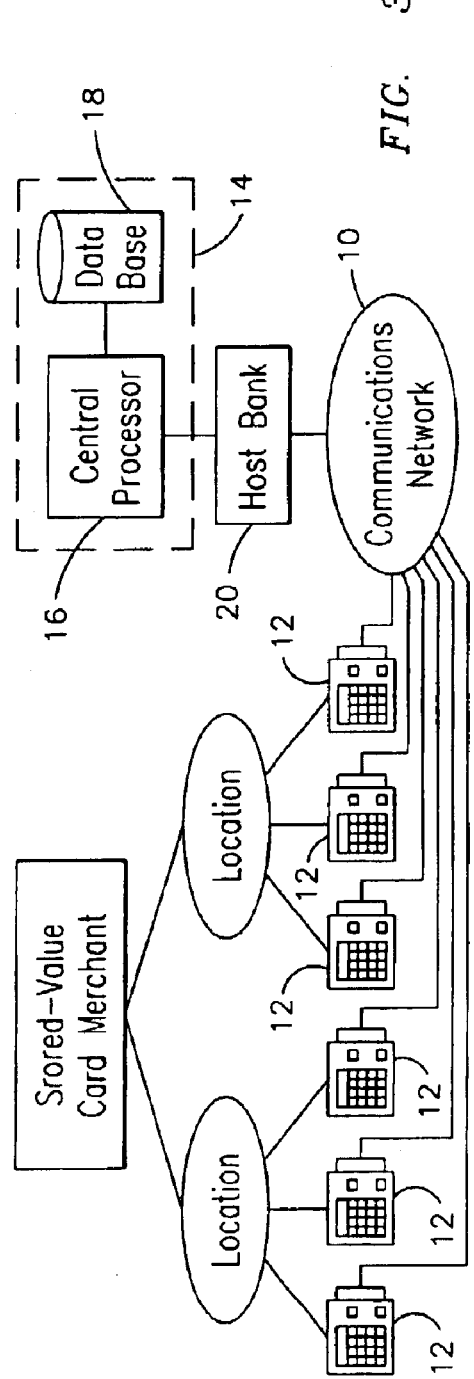
Figure 4:
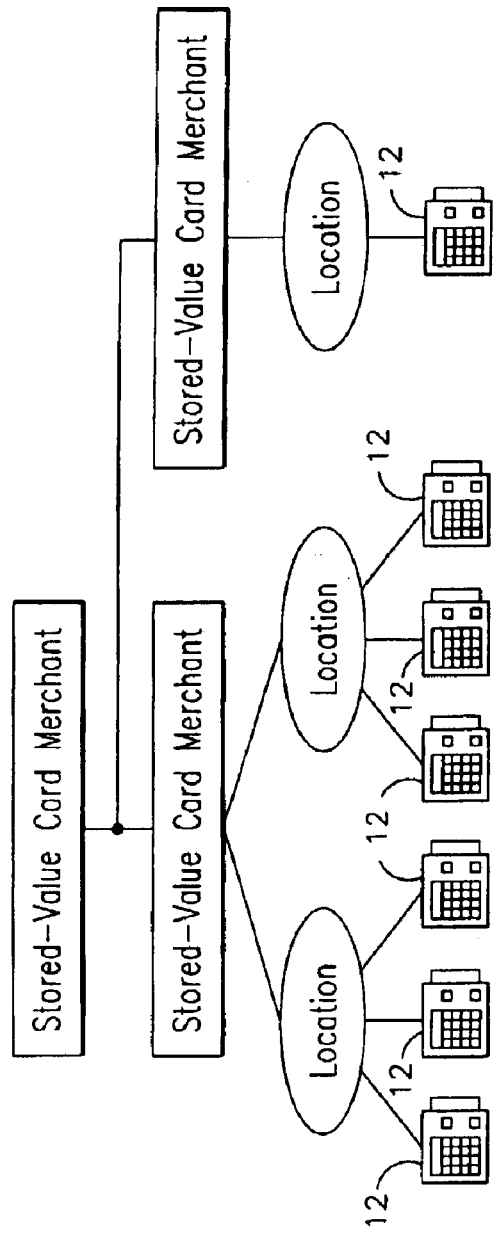
Figure 5:
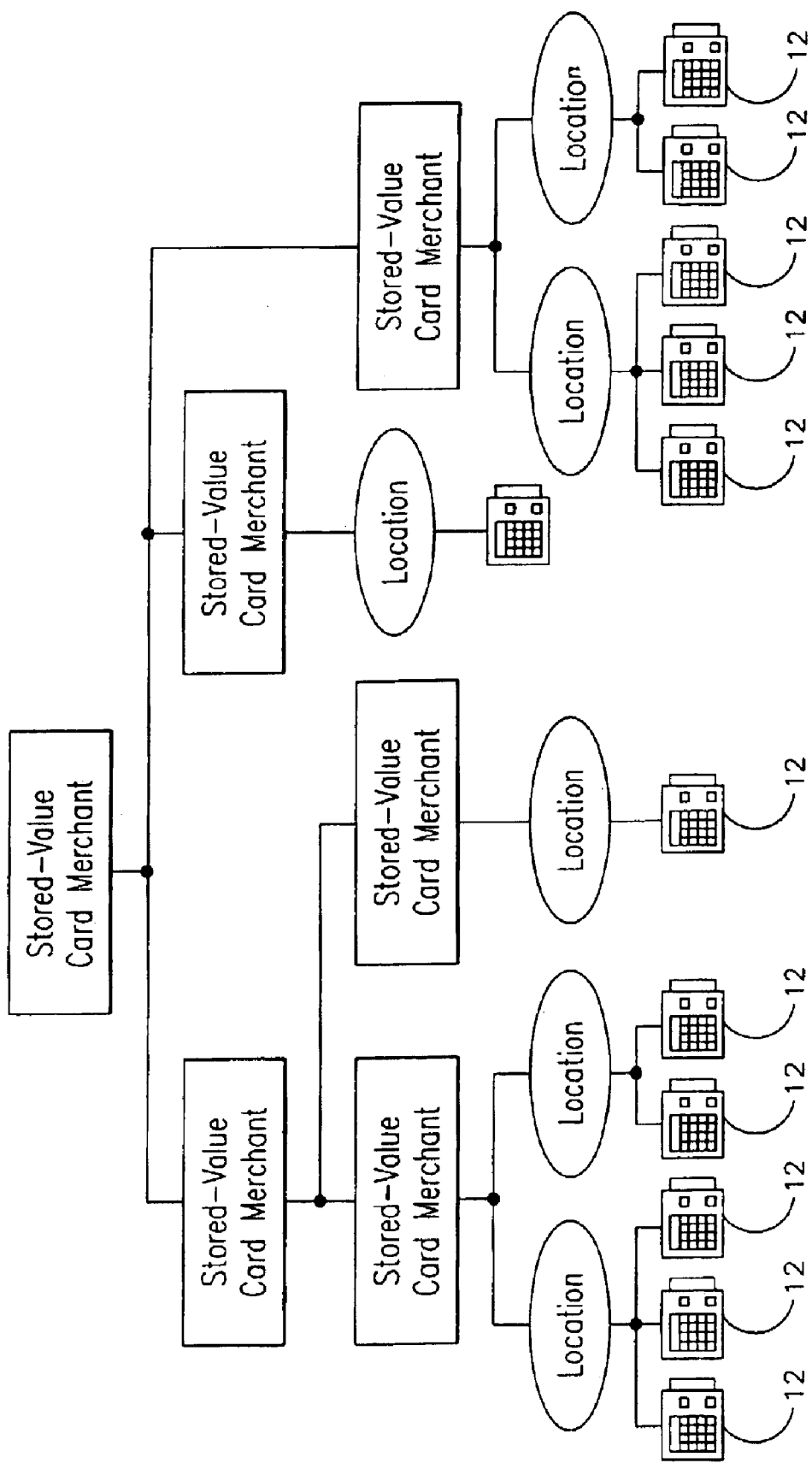

As shown in FIGS. 1 through 3, by way of a communications network 10, e.g., a phone network, credit or debit card network, the Internet, an intranet, etc., over which credit or debit card transactions are authorized or denied, a point-of-sale terminal 12, e.g., a credit or debit card terminal, is used to send an authorization request to a stored-value card data management system 14, such as may be managed and operated by the assignee of the present invention. System 14 comprises a central processor 16 coupled to a database 18 that stores a plurality of records including stored-value card data for each stored-value card issued by the assignee of the present invention. It will be appreciated that in the case of a credit or debit card network each stored-value card transaction request is expected to be handled, on average, within approximately two seconds, or one could lose its certification to use that network. For the sake of simplicity of illustration, blocks representing the stored-value card data management system and other associated blocks are not shown in the user entity trees shown in FIGS. 4 and 5. It will be appreciated, however, that each of such user entity trees will be similarly interconnected to the stored-value card data management system as exemplarily illustrated in FIGS. 1 through 3 or as further described below.

In one aspect of the present invention, the stored-value card may only be authorized if the request is made by any of a set of designated terminals. These terminals will be associated with respective identifier numbers by an associating module configured to associate in each stored record respective identifiers to uniquely match a respective stored-value card and a respective terminal.

A respective requesting terminal, using the communications network, may send an authorization request through a suitable host bank 20 to the central processor. FIGS. 1 through 3 show an exemplary link architecture between the communications network and the central processor through the host bank, that is, the link architecture allows communication of card-related data from the merchant, to the communications network, which in one exemplary embodiment would be the Visa network if this was a Visa-routed transaction, to the host bank, and then to the central processor. It will be appreciated that other link architectures may be implemented, such as a host-to-host architectural connection. In this case, the communications network, such as a dedicated link or the internet, would be directly between a merchant's "host" system and a "host" system of the assignee of the present invention. Thus, the present invention is not limited to applications that require a host bank being that a host-to-host connection does not require any host bank or Visa network to transfer the card-related data to the central processor.

The authorization request includes information about the card swiped and the terminal used to swipe it, such as the electronic signature of that terminal. A processing module configured to process a request of stored-value card activation will analyze this data and send back either an authorization or a disapproval to the requesting terminal. If authorized, a database coupled to the central processor will be updated to reflect any authorization or disapproval.

In another aspect of the system of the present invention, merchants and terminals can be divided into groups, membership of which varies depending on whether the context of the grouping is for the purpose of executing any specific action out of a set of actions that a respective user may execute, such as card activation, billing, commission payments, reporting, inventory management, etc. For example, terminal A from Merchant X may be in activation group I with terminal B from merchant Y, yet for billing purposes the two terminals may be in different groups. Management and definition of these groups is the responsibility of a module configured to store in the database a table indicative of the set of actions that a respective user may execute from a respective terminal.

In one exemplary embodiment, requests in connection with the stored-value card data management process may include three basic actions: stored-value card activation, deactivation, and incrementing. These requests may be selectively encoded so as to be differentiated by the transaction amount received from the host back in the authorization packet. The transaction amount would thus comprise predefined codes that may be stored in a table of predefined codes stored in the database. Such codes may then be associated with respective user groups. It will be appreciated that the transaction amounts, i.e., predefined codes and their interpretations will vary from merchant to merchant. For example, for merchants A and C, the requests may be encoded so that a stored-value card activation request has the form $.01, a deactivation request has the form $.02, and an incrementing request will have the form $.03. On the other hand, for merchant B, a code of the form $2.00 may indicate a stored-value card activation request, a code of the form $3.00 may indicate a deactivation request, and a code of the form $4.00 may indicate a request for incrementing the value associated with the stored-value card by an amount equal to the original value of that card. For security purposes, regardless of the interpretations for each merchant, $1.00 cannot be used for any code.

As suggested above, there may be various categories of stored-value cards, such as standard telecommunications cards, setup cards, gift cards, sales cards, promotional cards, etc. These cards are differentiated by the unique encoded control number for the card. The stored-value cards identified as standard stored-value cards are the actual stored-value cards marketed by the assignee of the present invention as Fastcards$^{SM}$ stored-value cards.

Node Organization

For consistency in the database controlled by the central processor, hierarchical relationships between distributors, merchants, locations and terminals are configured to reflect the actual business relationships therebetween. As suggested above, distributors, locations, and terminals may comprise a single flat layer, while merchants can have any number of nesting levels.

To organize this structure in the database, each entity in this hierarchy can be uniquely specified by providing two data elements, such as the node ID and the node type. The node ID of any entity is the unique key in a node's table, while the node type identifies a table for that node. For example, the NodeTypes table defines the node types associated with each table. In one exemplary embodiment, the set of defined node types are as follows:

0—Global/User

1—Customer/Distributor

2—Merchant

3—Location

4—Terminal

It will be appreciated that the present invention need not be limited to the above-illustrated organization since other node types could be implemented, if so desired.

The combination of node ID and node type define the scope, or domain, of a given section of the tree. Users and cards are assigned to a particular node on the tree, which allows stored-value card data management to be processed unambiguously. It will be appreciated by those skilled in the art, that use in the system use this scoping technique enables to substantially filter out forbidden user actions.

Any system user is assigned to a specific node, known as that user's root. The user's root determines the entities that the user is allowed to manipulate. A global user can manipulate any entity in the database, while a user assigned a terminal root can only manipulate that terminal.

Users are also assigned a set of discrete privileges. These privileges determine what actions can be performed by that user. For example, a user with a Create Locations privilege is allowed to create locations, provided that the user also is assigned to a merchant level root or higher.

Reporting

Reports may be available by terminal, by location, and/or by any merchant/distributor level in the hierarchy. Regardless of the starting point in the hierarchy, reports may be available at any level of aggregation below the starting point.

DENOMINATION CODING

All request actions to be performed during the activation process, as well as the valid range of values for these actions, may be encoded in a single 8-character denomination field available in the communication network. As suggested above, for each merchant or user group there may be defined a set of codes that can be used to process activations, deactivations, and stored-value cards incrementing. These codes may be defined through the use of the string codes and masks as further described below.

String Codes

In one exemplary embodiment, the following string codes are used:

TABLE 0-1

Denomination String Codes

| Code | Interpretation |
| --- | --- |
| 0 | Position is a zero |
| X | Position is undefined, any value is valid |
| A | Position is part of an action field |

TABLE 0-1-continued

Denomination String Codes

| Code | Interpretation |
|------|----------------|
| V | Position is part of a value field |
| M | Position is part of a macro field |

The string codes may be used to define a denomination mask, as defined below. Note that by way of example there may be three field types: actions, values, and macros.

An action field indicates a value-free action to be performed, where the value is specified in an accompanying value field. A macro field combines knowledge of action and value into one field.

Masks

Using the foregoing exemplary string codes, it is then possible to define fields in a mask, which will then be decoded to perform the appropriate action on an arriving denomination field. There may be a few rules to be applied to defining a mask, such as the following exemplary rules:

Mask Rule 1. All eight characters of the denomination field should be accounted for. The "0" and the "X" string codes allow unused characters to be filled with placeholders. Example: "0000VVAA" is a valid mask, whereas "VVAA" is not.

Mask Rule 2. A mask may contain either a) one A field and one V field, or b) one M field. Example: "0000VVAA" is a valid mask, as is "0000XXMM", but "0000VVMM", "0000AA00", or "0000MMAA" are not.

Mask Rule 3. All characters forming an A, V, or M field should be contiguous. 0 and X characters can be sprinkled in as needed. Example: "00AA0VVV" and "00AAAVVV" are valid masks, whereas "A0AAVV00" is not.

Example 1

Assuming a Merchant is Assigned the Following Codes

"00000001" will activate a card, regardless of denomination
"00000002" will deactivate a card, regardless of denomination
"00000003" will refresh the card with the card's face value
Then, as the action and the value to be used are intermingled, the proper mask for this merchant would be "0000000M", where the M field can be 1, 2, or 3. In this case, there is no value to be validated, yet for case 3, the card's own face value is used to increment value
A different mask may consist of:
"00000200" will activate a card, regardless of denomination
"00000300" will deactivate a card, regardless of denomination
"00000400" will refresh the card with the card's face value

MASK DESIGN

During the design of a mask for each customer, the following issues should be addressed. First, whether any zeros or "Don't Care" characters should be defined.

Next, it should be determined whether an action/value mask or a macro mask should be used. To decide, determine whether the value field in the denomination code can be separated from the action field. If they can be separated, then the mask is an action/value mask. If the action and the value are intimately related, then the mask is a macro mask.

Action/Value Mask Design

With an action/value mask, the set of action codes for activation, deactivation, and increment should be selected.

With the increment action for a stored-value card, the relationship between the value field, the card's face value, and the value to increment the value of the stored-value card will have the following relationship: The card's face value is used to increment the value of the card, regardless of the value field.

Macro Mask Design

With a macro mask, the set of action codes and their associated values may be created. The logical decisions involved closely mirror those for the action/value mask, except that it may not be possible to validate the value field with the card's face value, as the value field does not exist. Viewed this way, the possible masks are a subset of the action/value masks without any validation. For example, for activation and deactivation, two macro codes may be assigned, one for each action. For incrementing the value of the stored-value card, a unique macro code may be assigned to correspond to the value to be placed on the card. It will be appreciated that if it is desired to only refresh with the card's face value, then a single code may be assigned for incrementing the value of the stored-value card. Once the foregoing logical decisions are made, the a mask builder module can be used to construct the database records necessary to allow proper validation and actions by the users of the stored-value card data management system.

EXEMPLARY IMPLEMENTATION

The foregoing discussion sets forth the view of the masks from the system user's perspective. Internally, an activator module behaves as if all masks are macros, where the action and value fields form a "macro mask", hence the term. So, it may be helpful for the system to process a user's specification of the action/value fields and convert them to an enumeration of all valid cases, using the concatenation of the action and value fields, preferably in that order, to form the macro key.

To prevent such enumerations from becoming too populous, it may be helpful to constrain the multiplier, increment, and maximum value parameters. In one exemplary embodiment, these parameters will be mutually constrained to allow a maximum of 128 action/value combinations to be defined, including activation and deactivation. Alternatively, a maximum of 128 macro actions could be defined, including activation and deactivation. In practical terms, however, it is believed than less than a dozen should prove sufficient.

Figure 6:
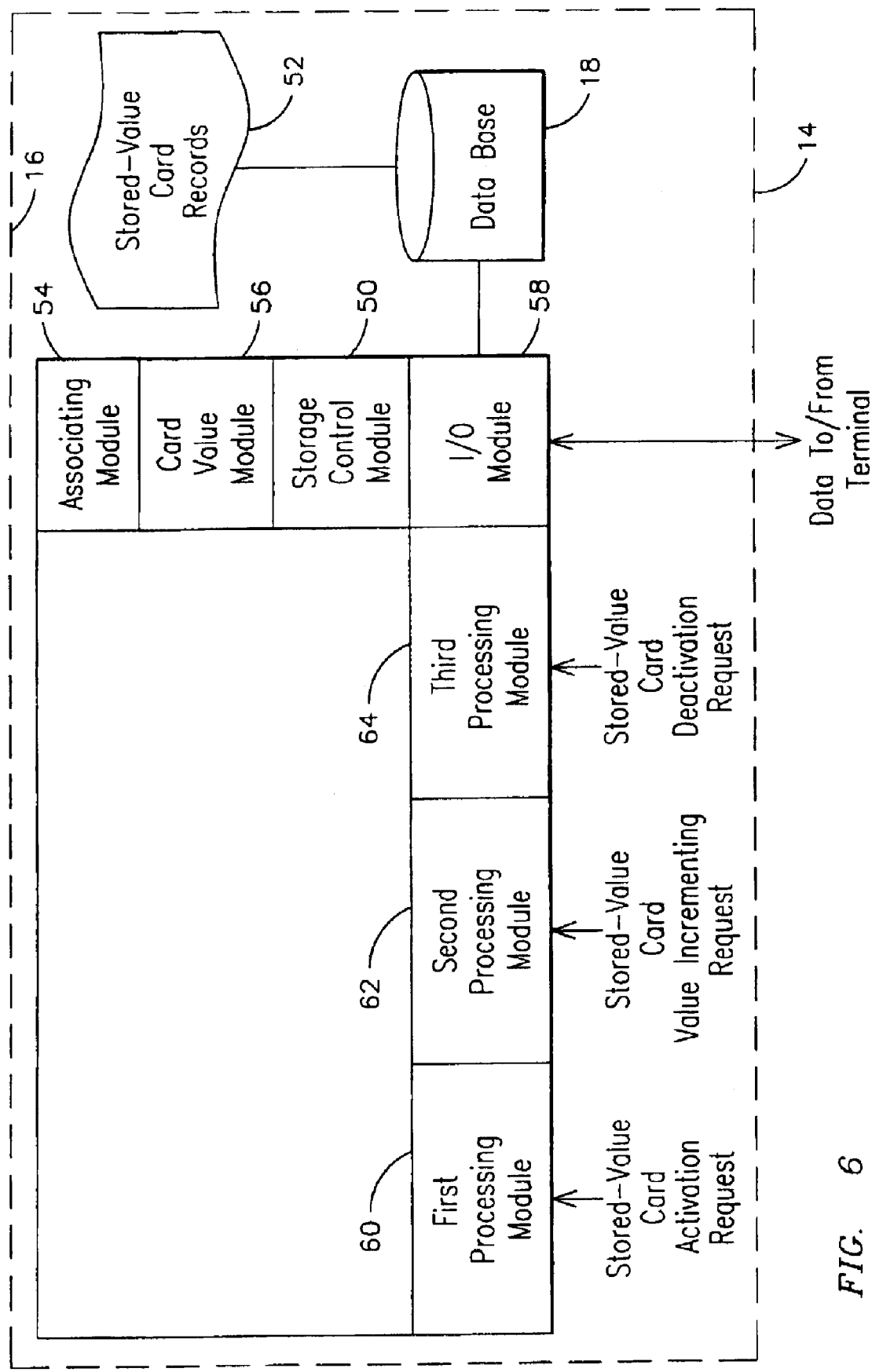
FIG. 6 is an exemplary modular architecture of the telecommunications card data management system shown in FIGS. 1–3.

FIG. 6 illustrate further details in connection with stored-value card data management system 16. As shown in FIG. 6, central processor 16 includes a storage control module 50 that allows for storing in database 18 a plurality of records 52 comprising stored-value card data for each stored-value card. An associating module 54 allows for associating in each stored record respective identifiers that uniquely match a respective stored-value card and a respective terminal. A value module 56 allows for defining in each stored record a parameter corresponding to the face value of each respective stored-value card. That parameter could comprise a monetary amount corresponding to the face value of each respective stored-value card or such parameter' could comprise time units corresponding to the face value of each respective stored-value card, or both. Stored-value card data transmitted over the communications network may be received by input/output module 58 so that a first processing module 60 may process a request of stored-value card activation to the central processor from a respective requesting terminal. The central processor thus allows for accepting or declining the activation request based on whether the associated identifiers for the stored-value card to be activated match the identifiers actually transmitted by the requesting terminal for that stored-value card and terminal. As suggested above, the request for stored-value card activation enables to associate a value for the card to be activated and that value is preferably solely based on the parameter corresponding to the face value for that card.

As further shown in FIG. 6, a second processing module 62 allows for processing a request for incrementing the value associated with a respective stored-value card. The request is transmitted over the communications network to the central processor from a respective requesting terminal. The central processor thus further allows for accepting or declining the increment value request based on whether the respective identifiers stored in the record for the stored-value card whose associated value is to be incremented match the identifiers actually transmitted by the requesting terminal for that stored-value card and terminal. As suggested above, the incrementing request may be solely based on multiples of the parameter corresponding to the face value of that stored-value card. A third processing module 64 allows 10 for processing a request of stored-value card deactivation to the central processor from a respective requesting terminal. In this case, the central processor is configured to accept or decline the deactivation request based on whether the respective identifiers stored in the record for the stored-value card to be deactivated match the identifiers actually transmitted by the requesting terminal for that stored-value card and terminal.

The storage control module may be programmed to store in the database a table indicative of a set of actions that a respective user may execute from a respective terminal. The set of actions that may be executed by that respective user corresponds to a predefined hierarchy table stored in the database for that user.

Figure 7:
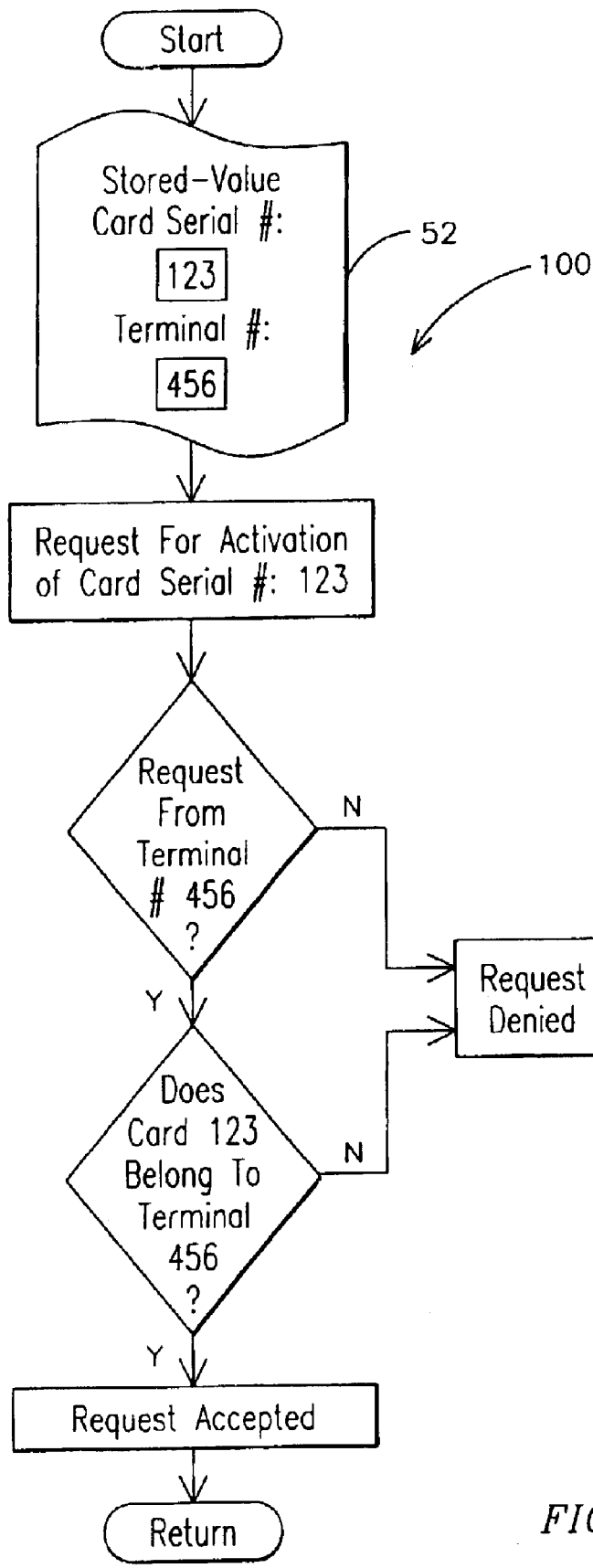
FIG. 7 is an exemplary flow chart illustrating one aspect of the present invention as may be implemented by the system of FIG. 6.

FIG. 7 illustrates an exemplary flow chart 100 such as may be implemented by a stored-value card data management system embodying one aspect of the present invention. As shown in FIG. 7, assuming that in a given stored-value card record, a stored-value card serial No. 123 is associated with terminal No. 456, then a request for activation of stored-value card serial No. 123, may be processed as follows: A verification module would allow for determining whether that request came from terminal No. 456. If the verification module determines that in fact such request was generated from terminal No. 456, and card 123 has been assigned to the location containing terminal 456, then the central processor would generate a message indicating that the request has been accepted. If the verification module determines that the requesting is other than terminal No. 456, or if the card is not assigned to the location, then a message would be issued declining the transaction.

The stored-value card data management system in one exemplary embodiment enables a web-based, ID and password protected application available to anyone with internet access and the appropriate ID and Password. As described-above, the system comprises respective modules for card generation, merchant establishment, location establishment, terminal setup by assigning setup cards to a location, and inventory assignment to merchants and/or locations. The system may also used for other card-related actions, such as web-based activation, deactivation and refresh. The system further comprises a reporting engine that allows for generating reports for sales analysis, inventory control and billing. The system further comprises a trouble-shooting interface with visibility into each transaction, card, location, terminal and merchant. In operation, the system comprises an automated card replenishment system, keeping track of any unactivated card inventory at a location and alerting the appropriate individual when the inventory falls below a predefined level.

As will be appreciated by those skilled in the art, in a major credit card network, merchants will generally reconcile their report of transactions based on their credit card terminal against the acquiring banks report of transactions. When processing activation of cards on the Fastcard system, the transaction may appear like a standard credit card transaction to the merchant's terminal. The bank, however, does not see a Fastcard transaction as a standard transaction, and does not process it. This could potentially cause a discrepancy when the report from the terminal and the report from the bank do not agree. To eliminate this discrepancy, the Fastcard system is configured to change its response to the transaction request to a decline message. By way of example, there may a plurality of distinct decline messages, e.g., more than 50 different decline messages, the system can send, and one can choose a decline message that is a unique message on a given merchant's terminal. Thus, the merchant may be readily trained to view this unique decline message as an indication that the activation of the card is successful. In operation, when the system responds with that unique decline message, the bank does not view this as a real transaction, thus eliminating the reconciliation issue. As suggested above, the Fastcard system has the capability of custom tailoring the response sent back to the merchant on a location by location basis.

The present invention can be embodied in the form of computer-implemented processes and apparatus for practicing those processes. The present invention can also be embodied in the form of computer program code containing computer-readable instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. The present invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose computer, the computer program code segments configure the computer to create specific logic circuits or processing modules.

An exemplary data structure and detailed tables implemented in the stored-value card data management of the system of the present invention is described in further detail in Appendix I below.

APPENDIX I

1. DATA MODEL 24
   1.1 DIAGRAMS 25
      1.1.1 Core Data Model 25
      1.1.2 Supporting Data Model 26
   1.2 TABLES 27
      1.2.1 ActionGroup 27
      1.2.2 ActionSet 27
      1.2.3 ActionType 28
      1.2.4 ActivityLog 29
      1.2.5 ActivityLogFile 30
      1.2.6 ActivityLogMellon 30
      1.2.7 ActivityLogOpCode 31
      1.2.8 ActivityLogWeb 31
      1.2.9 Address 31
      1.2.10 CardGroupDCMS 32
      1.2.11 CardGroupSkytel 33
      1.2.12 Contact 33
      1.2.13 ContactPhoneNumber 34
      1.2.14 Customer 34
      1.2.15 DCMS 35
      1.2.16 DCMSPath 35
      1.2.17 EntityContact 36
      1.2.18 CardDCMS (future) 36
      1.2.19 CardSkytel 37
      1.2.20 CardStatus (future) 37
      1.2.21 Fastcard 38
      1.2.22 Fastcard (future) 39
      1.2.23 FastCard_Type 40
      1.2.24 GlobalIDs 41
      1.2.25 LegacyActivation 42
      1.2.26 Location 42
      1.2.27 Merchant 43
      1.2.28 MerchantStatus 44
      1.2.29 MerchantTerms 44
      1.2.30 NodeTypes 45
      1.2.31 PhoneNumber 45
      1.2.32 PhoneNumberType 46
      1.2.33 PinHolding 46
      1.2.34 PinHoldingGroup 46
      1.2.35 PrivGroupPrivs 47
      1.2.36 PrivGroups 48
      1.2.37 QueueSkytel 48
      1.2.38 Terminal 49
      1.2.39 UserPrivs 49
      1.2.40 UserPrivTypes 50
      1.2.41 Users 50
      1.2.42 WebFrame 51
      1.2.43 WebLink 51
      1.2.44 WebPage 52
      1.2.45 WebPageIcon 52
   1.3 VIEWS 53
      1.3.1 ViewActivityLogMellon 53
   1.4 STORED PROCEDURES 54
      1.4.1 QryCL_GetCustomerByName 54
      1.4.2 QryCL_GetMatchingDCMS 54
      1.4.3 QryCL_GetPathByID 55
      1.4.4 QryCL_ImportPinHolding 55
      1.4.5 QryCL_InsertDCMS 56
      1.4.6 QryCL_InsertPinHolding 56
      1.4.7 QryCL_InsertPinHoldingGroup 57
      1.4.8 QryFCMS_AssignCardOwner 58
      1.4.9 QryFCMS_AssignSetupCard 58
      1.4.10 QryFCMS_ChangePassword 59
      1.4.11 QRYFCMS_CheckUserPrivGroup 60
      1.4.12 QryFCMS_CompareNodes 60
      1.4.13 QryFCMS_CompareToUser 61
      1.4.14 QryFCMS_CompareEntityToOldCard 61
      1.4.15 QryFCMS_CompareOldCardToUser 62
      1.4.16 QryFCMS_ConfirmCardMaintActions 63
      1.4.17 QryFCMS_ConfirmImportCards 63
      1.4.18 QryFCMS_ConvertOldFastcardOwnerType 64
      1.4.19 QryFCMS_GetCardMaintActions 64
      1.4.20 QryFCMS_GetNextGlobalID 64
      1.4.21 QryFCMS_ImportCards 65
      1.4.22 QryFCMS_LogonUser 65
      1.4.23 QryMellon_Auth4001 66
      1.4.24 QryMellon_Rev4001 67
      1.4.25 QryMellonAuthorization 68
      1.4.26 QryMellonReversal 68
      1.4.27 QryMellonSetupTerminal 69
      1.4.28 QryMellonVerifyTerminal 69
      1.4.29 QrySkytel_AddToAuthorizationQueue 69
      1.4.30 QrySkytel_AddToDeauthorizationQueue 69
      1.4.31 QrySkytel_GetCurrentQueue 70
      1.4.32 QrySkytel_GetQueueItem 71
      1.4.33 QrySkytel_UpdateQueue 71
      1.4.34 QryUE_CheckUserName 72
      1.4.35 QryUE_DeleteAllUserPrivs 72
      1.4.36 QryUE_GetUserPrivs 73
      1.4.37 QryUE_InsertUser 73
      1.4.38 QryUE_InsertUserPriv 74
      1.4.39 xp_generatecards 74
      1.4.40 xp_ConvertHexadecimal 76
      1.4.41 xp_ValidateDenomination 77
2. USER PRIVILEGE FRAMEWORK 78
   2.1 RELEVANT DATABASE SCHEMA 78
      2.1.1 Tables 78
      2.1.2 Stored Procedures 78
3. AUTHORIZATION RULES 79
   3.1 MELLON MESSAGES 79
      3.1.1 Network Messages 79
      3.1.2 Financial Messages 83
   3.2 ACTIVATOR STATES 86
   3.3 ACTIVATOR ACTIONS 86
      3.3.1 Logon State Actions 87
      3.3.2 Logoff State Actions 88
      3.3.3 Pending Logon State Actions 89
      3.3.4 Pending Logoff State Actions 90
   3.4 MELLON ACTIVATOR PROCESSES 91
      3.4.1 Authorization Process 91
      3.4.2 Reversal Process 92
      3.4.3 Setup Process 93
      3.4.4 Standard Card Activation Process 94

3.4.5 Standard Card Deactivation Process 94
3.4.6 Standard Card Refresh Process 95
3.4.7 Standard Card Unrefresh Process 95
3.4.8 Promotional Card Activation Process 95
3.4.9 Promotional Card Deactivation Process 96
3.4.10 Gift Card Activation Process 96
3.4.11 Gift Card Deactivation Process 96
4. SCENARIOS 96
  4.1 ADDING A MERCHANT TO THE SYSTEM 96
  4.2 ASSOCIATING SETUP CARDS WITH A MERCHANT 97
  4.3 USING A SETUP CARD 97
  4.4 HANDLING A FASTCARD ACTIVATION OR DEACTIVATION 97
5. USE CASES 97
  5.1 USER INSTANCE CASES 97
    5.1.1 Create A User 97
    5.1.2 Edit A User 97
    5.1.3 View A User 97
    5.1.4 Delete A User 98
  5.2 CUSTOMER INSTANCE CASES 98
    5.2.1 Create A Customer 98
    5.2.2 Edit A Customer 98
    5.2.3 View A Customer 98
    5.2.4 Delete A Customer 98
    5.2.5 Generate Customer Reports 98
  5.3 MERCHANT INSTANCE CASES 98
    5.3.1 Create A Merchant 98
    5.3.2 Edit A Merchant 98
    5.3.3 View A Merchant 98
    5.3.4 Delete A Merchant 98
    5.3.5 Generate Merchant Reports 98
  5.4 LOCATION INSTANCE CASES 98
    5.4.1 Create A Location 98
    5.4.2 Edit A Location 98
    5.4.3 View A Location 99
    5.4.4 Delete A Location 99
    5.4.5 Generate Location Reports 99
  5.5 TERMINAL INSTANCE CASES 99
    5.5.1 View A Terminal 99
    5.5.2 Delete A Terminal 99
    5.5.3 Generate Terminal Reports 99
  5.6 CARD INSTANCE CASES 99
    5.6.1 Activate a Fastcard In-Place 99
    5.6.2 Activate a Fastcard Remotely 100
    5.6.3 Deactivate a Fastcard In-Place 101
    5.6.4 Deactivate a Fastcard Remotely 102
    5.6.5 Refresh a Fastcard 103
    5.6.6 Set Card As Missing 103
    5.6.7 Move Card To An Entity (Import Cards) 104
    5.6.8 Associate Setup Cards 105
    5.6.9 View Card Properties 105
    5.6.10 Edit Card Properties 105
6. TRANSACTION OPERATION CODES 106
Table of Figures
  FIG. 1—1 Merchant Manager Core Data Model 25
  FIG. 1-2 Merchant Manager Supporting Data Model 26
  FIG. 3-1 Logon/Logoff States 86

Table of Tables

Table 1—1 Card Status Definitions 38

Table 1-2 Valid Card Types 40

Table 1-3 Global ID Definitions 41

Table 1-4 Valid Merchant Status Types 44

Table 1-5 Valid Merchant Status Types 45

Table 1-6 Privilege Group Definitions 47

Table 3-1 Key Handshake Request Fields 80

Table 3-2 Key Handshake Response Fields 80

Table 3—3 Key Logon Request Fields 80

Table 3-4 Key Logon Response Fields 81

Table 3-5 Key Logoff Request Fields 81

Table 3-6 Key Logoff Response Fields 82

Table 3-7 VAN16 and EXPDATE in Track 2 83

Table 3-8 Key Authorization Request Fields 83

Table 3-9 Key Authorization Response Fields 84

Table 3-10 Key Reversal Response Fields 85

Table 6-1 Valid Transaction Operation Codes 106

DATA MODEL

In this chapter, the data model used to implement Fastcard and Merchant Management are detailed. First, data diagrams are provided, and then each table is examined individually.

Diagrams

This section provides diagrams for the data model used in Fastcard and Merchant Management.

Core Data Model

The following diagram displays the tables, fields, and major relationships among the core tables in the system.

Figure 0-1 Merchant Manager Core Data Model

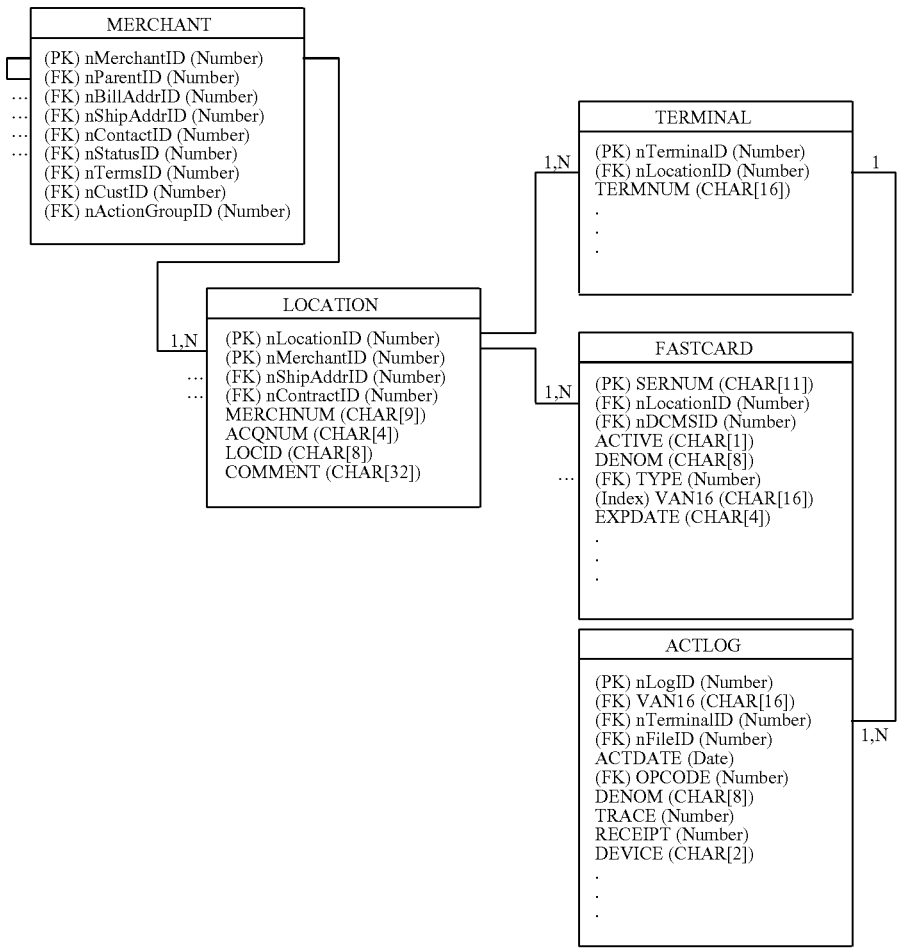

As shown in figures 0-1, the Merchant Manager Core Data Model consists of tables sufficient to associate merchants with acquirers, setup cards with merchants, terminals with merchants, and Fastcards with merchants. This data model also supports logging and tracking of activation activity. The tables and fields are described in detail in a later section.

Supporting Data Model

The following diagram displays the tables and fields used to support the core tables.

Figure 0-2 Merchant Manager Supporting Data Model

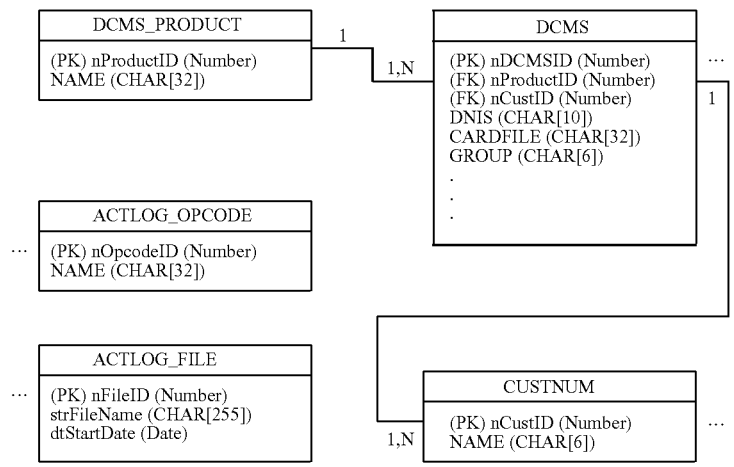

ADDRESS
... (PK) nAddressID (Number)
ADDR1(CHAR[64])
ADDR2 (CHAR[64])
CITY (CHAR[32])
STATE (CHAR[2])
ZIP (Number)

FASTCARD_TYPE
(PK) nCardTypeID (Number) ...
NAME (CHAR[32])

MERCH_STATUS
(PK) nStatusID (Number) ...
NAME (CHAR[32])

CONTACT
... (PK) nContactID (Number)
LAST_NAME(CHAR[16])
FIRST_NAME (CHAR[16])
VOICE (CHAR[24])
FAX (CHAR[24])
EMAIL (CHAR[64])

MERCH_TERMS
(PK) nTermsID (Number) ...
NAME (CHAR[32])

As shown in figures 0-2, the Supporting Data Model is used to supply additional information about records in the Core Data Model. These tables are also described below.

Tables

The tables used for Merchant Management and Fastcard activation/deactivation are described in this section.

ActionGroup

This table contains a Merchant Manager user's definition of the parameters used to setup the action masks for a set of merchants.

Fields nGroupID Number (PK): Unique ID for this record, assigned sequentially when record is created.

strName CHAR[32]: Name of this action group. Ex: "Piggly Wiggly".

strMask CHAR[8]: Action/value or macro mask for this group.

bActionValue BOOL: If TRUE, this group defines an action/value mask. If FALSE, this group defines a macro mask.

nMultiplier Number: Defines the value multiplier for action/value masks.

nIncrement Number: Defines the allowed value increment for action/value masks.

nMaximum Number: Defines the maximum value for action/value masks.

ActionSet

This table contains a Merchant Manager user's definition of a set of action masks for a set of merchants.

Fields nActionID Number (PK): Unique ID for this record, assigned sequentially when record is created.

nActionGroupID Number (FK): Links to ACTION_GROUP.nGroupID. Indicates the action group to which this item belongs.

strMask CHAR[8] (Indexed with nActionGroupID): Left-justified macro mask values or concatenated action-value mask values. The denomination field of a Mellon packet, when decoded using the group mask, is used to search for this field within an action group.

nActionTypeID Number (FK): Links to ACTION_TYPE.nTypeID. Indicates the category of this action.

strValueDCMS CHAR[8]: DCMS denomination to be applied for this action. NULL for non-refreshes. Also NULL for refreshes where the FASTCARD.DENOM field is used to refresh.

strValueCheck CHAR[8]: Left-justified value characters to be used to validate the value characters of the Mellon packet, as defined by the value mask for action-value masks. Null for macro masks. Also NULL for action-value masks not requiring value validation.

ActionType

This table contains the set of allowed action types.

Fields nActionTypeID Number (PK): Unique ID for this record, assigned sequentially when record is created.

strName varchar[128]: Description of this action type.

The set of defined values, and their interpretation, are defined below:

0—Activate without validating the value. Use for macro masks and for action-value masks not requiring a validation of the value.

1—Validate the denomination field using the value mask and the ActionSet.strValueCheck field, then activate.

2—Deactivate without validating the value. Use for macro masks and for action-value masks not requiring a validation of the value.

3—Validate the denomination field using the value mask and the ActionSet.strValueCheck field, then deactivate.

4—Refresh for the value of FASTCARD.DENOM without validating the value.

5—Validate the denomination field using the value mask and the ActionSet.strValueCheck field, then refresh for the value of FASTCARD.DENOM.

6—Refresh for the value of ActionSet.strValueDCMS without validating the value.

7—Validate the denomination field using the value mask and the ActionSet.strValueCheck field, then refresh for the value of ActionSet.strValueDCMS.

8—Refresh without validation. Use the value mask to establish the refresh amount.

Activity Log

This table implements the core activity log for the Fastcard system.

Fields nLogID int (PK): Unique ID for this record, assigned sequentially when record is created.

VAN16 CHAR[16] (FK): Identifies the Fastcard for which this record was created. Links to FASTCARD.VAN16.

dtCreateDate datetime: Date/time for which this log entry was created.

OpCode int (FK): Number indicating the type of event for which this log entry was created. Links to ActivityLogOpCode.nOpcodeID.

nRootNode int (~FK): Entity root node for this log entry. Table referenced depends on the value of nNodeType.

nNodeType int (FK): Entity node type for this log entry. Links to NodeTypes.nNodeTypeID.

ActivityLogFile

This table contains the path and filenames for all transaction log files.

Fields nFileID int (PK): Unique ID for this record, assigned sequentially when record is created.

strFileName varchar[128]: Path and filename for the transaction log.

dtStartDate datetime: Date/time this record was created.

ActivityLogMellon

This table implements an activity log for the Mellon portion of the Fastcard system.

Fields nLogID int (PK): Unique ID for this record, links to ActivityLog for the core log information.

nFileID (FK) int: Filename containing the transaction entry that generated this activity log entry. Links to ActivityLogFile.nFileID.

strDenom char[8]: Currency or unit value for this event.

nTrace int: Trace number for the packet causing this event.

nReceipt int: Receipt number for the packet causing this event.

strMellonCode char[3]: Mellon code returned for this event.

strDevice char[2]: 2-digit device code for the terminal initiating this event.

strComment varchar[128]: Diagnostic string returned by the authorization procedures. Merge into an ActivityLog field.

ActivityLogOpCode

This table provides a list of all valid operation codes.

Fields nOpcode int (PK): Unique ID for this record, assigned when record is created.

strName CHAR[32]: Descriptive text for this operation code.

The list of valid values are given in Chapter 0, Transaction Operation Codes as Table 0-1 Valid Transaction Operation Codes.

ActivityLogWeb

This table implements an activity log for the web portion of the Fastcard system.

Fields nLogID int (PK): Unique ID for this record, links to ActivityLog for the core log information.

nWebUserID (FK) int: User generating this event. Links to Users.nUserID.

strComment varchar[128]: Comment for this event. Merge into an ActivityLog field.

Address

This table stores address information.

Fields nAddressID (PK) Number: This field contains the unique ID for this record, assigned sequentially when entered into the database.

strAddr1 varchar[64]: Line 1 of the address information.

strAddr2 varchar[64]: Line 2 of the address information. NULL if unused.

strCity varchar[64]: City of the address.

strState varchar[2]: 2-digit state code, NULL if unused for international addresses.

strCountry varchar[32]: Province/nation string for international addresses, NULL for US addresses.

strZipCode varchar[12]: Five- or nine-digit zipcode of the address, or locale-specific format for international addresses.

CardGroupDCMS

This table stores Legacy DCMS-specific information about card groups.

Fields nCardGroupID (PK) int: Unique ID of this record, assigned from GlobalIDs when record created. Links DNIS CHAR[10]: 800 or 888 number hosting this group. Used during the activation process to insert records into DCMS.

CARDFILE CHAR[32]: Btrieve filename containing this DCMS group.

nCustID int: DCMS Customer ID for this group, links to CUSTNUM.nCustID.

nPathID int: DCMS server path for this DCMS group. Links to DCMSPath.nPathID.

GroupID int: DCMS group number for this group.

Description varchar(64): Textual description of this group as entered into DCMS.

CardGroupSkytel

This table stores Skytel-specific information about card groups.

Fields nCardGroupID (PK) int: Unique ID of this record, assigned from GlobalIDs when record created.

strSKU char(25): Skytel-defined SKU strDescription char(50): Skytel-defined description strAmount char(11): Skytel-defined amount Contact This table stores contact information.

Fields nContactID (PK) Number: This field contains the unique ID for this record, assigned sequentially when entered into the database.

strFirstName varchar[32]: First name of the contact.

strMiddleName varchar[32]: Middle name(s) or initial(s) of the contact, if any.

strLastName varchar[32]: Last name of the contact, including any suffixes.

strTitle varchar[32]: Title for the contact.

strDear varchar[32]: Casual or familiar name for the contact.

strEmail varchar[64]: Email address of the contact strComment varchar[128]: Any descriptive text deemed appropriate.

Phone numbers for contacts are associated in the ContactPhoneNumbers table.

ContactPhoneNumber

This table stores associations between Contacts and PhoneNumbers.

nContactID (PK,FK) int: The contact for this association, links to Contacts.nContactID.

nPhoneNumberID (PK,FK) int: The phone number for this association, links to PhoneNumbers.nPhoneNumberID.

Customer
  This table stores customer information.
Fields
  nCustID (PK) int: This field contains the unique ID for this record, assigned when entered into the database from the GlobalIDs table.
    strName char[6]: DCMS/MAS90 customer number for this customer
    Description varchar[64]: Descriptive title for this customer.
    bHide boolean: When 1, this entity is to be hidden in the system. Still shows for reports/billing.
    dtCreated datetime: Time this entity was created in FCMS via the getdate( ) function.
DCMS
  This table stores DCMS-specific information about card groups. Will be replaced by CardGroupDCMS.
Fields
  nDCMSID (PK) int: Unique ID of this record, assigned from GlobalIDs when record created.
    DNIS CHAR[10]: 800 or 888 number hosting this group. Used during the activation process to insert records into DCMS.
    CARDFILE CHAR[32]: Btrieve filename containing this DCMS group.
    nCustID int: DCMS Customer ID for this group, links to CUSTNUM.nCustID.
    nPathID int: DCMS server path for this DCMS group. Links to DCMSPath.nPathID.
    GroupID int: DCMS group number for this group.
    Description varchar(64): Textual description of this group as entered into DCMS.
DCMSPath
  This table stores DCMS path information.
Fields
  nPathID (PK) int: Unique ID of this record.
    strName varchar(32): Short name for this server path.
    strPath varchar(128): Full path specification, including trailing slash.
    The currently defined list of servers are:
    1—Thor
    2—Zena
    3—Viper
EntityContact
  This table stores contacts for the various entities, allowing more than one contact to be identified for each entity, and a contact to be valid for more than one entity. User login accounts are not included in this relationship, as there can only be a one-to-one relationship between users and contact records. However, a user contact can also be a entity contact.
    nEntityID (PK,FK) int: ID of the entity for this relationship. The exact table linked depends on the node type.
    nEntityType (PK) int: The NodeType for this entity.
    nContactID (PK,FK) int: The Contact for this association, links to Contact.nContactID.
CardDCMS (future)
  This table stores information about cards in the system.
Fields
  nFastcardID int IDENTITY (PK/FK): Unique ID of this record, links to Fastcard.nFastcardID.
    strSerialNumber CHAR[11]: DCMS-style serial number of this Fastcard. Used to find the appropriate record in DCMS to activate.
    nStatus int (FK): Indicates the current card status. See CardStatus for a description of the possible values.
    strDenom char[8]: Denomination of this card, in $xxxxxx.xx for currency-based cards, number of units for unit-based cards.
CardSkytel
  This table stores information about cards in the system.
Fields
  nFastcardID int IDENTITY (PK/FK): Unique ID of this record, links to Fastcard.nFastcardID.
    strSerialNumber char[15]: Skytel-style serial number of this card.
    strSecurity char[15]: Skytel-defined security code for this card.
    nStatusID int (FK): Indicates the current card status. Links to CardStatus.nStatusID. See CardStatus for a description of the possible values.
    dtAuthorized datetime: Date card was last authorized, or NULL if not authorized.
    nCardGroupID int (FK): Temporary link to CardGroupSkytel until the Fastcard table is reworked.
CardStatus (future)
  This table stores card status information about cards in the system.
Fields
  nStatusID int (PK): Unique ID of this record
    strName: Friendly name of this status type.
    The currently defined valid values are given below:

TABLE 0-1

Card Status Definitions

| nStatusID | strName |
|---|---|
| 1 | Initial (created) |
| 2 | Active |
| 3 | Inactive |
| 4 | Pending Active |
| 5 | Pending Inactive |

Fastcard
  This table stores information about cards in the system.
Fields
  nFastcardID int IDENTITY (PK): Unique ID of this Fastcard record.
    SerialNumber CHAR[11]: DCMS-style serial number of this Fastcard. Used to find the appropriate record in DCMS to activate.
    nOwnerID int: ID of the entity owning this Fastcard.
    nOwnerType int: Deprecated version of the owner of this Fastcard. 0 indicates Customer, 1 indicates Merchant, 2 indicates Location. Will be changed to the definitions in NodeTypes.
    nDCMSID (FK) Number: Links to DCMS.nDCMSID, or NULL for Setup cards. Provides information about the DCMS location of this card.
    Active CHAR[1]: Flag indicating whether the card is active ("A") or inactive ("D").
    Denomination CHAR[8]: Denomination of this card, in $xxxxxx.xx for currency-based cards, number of units for unit-based cards.
    Type Number: Code indicating the type of Fastcard, links to FastCard_Type.nCardTypeID. The list of valid values is given under the description for the FastCard_Type table.
    VAN16 char[16] (Index): This field contains the 16-digit VISA number for the card.

ExpDate char[4]: VISA-style expiration date for this Fastcard as MMYY. Used to validate magnetic stripe information during activation/deactivation.

Fastcard (future)

This table stores information about cards in the system.

Fields nFastcardID int IDENTITY (PK): Unique ID of this Fastcard record.

nOwnerID int: Owner root node for this card. Table referenced depends on the value of nOwnerType.

nOwnerType int: Owner node type for this card. Links to NodeTypes.nNodeTypeID.

nCardGroupID (FK) Number: Links to the appropriate card group table record, depending on the card type.

nCardType Number: Code indicating the type of Fastcard, links to FastCard_Type.nCardTypeID. The list of valid values is given under the description for the FastCard_Type table.

strVAN16 char[16] (Index): This field contains the 16-digit VISA number for the card.

strExpDate char[4]: VISA-style expiration date for this Fastcard as MMYY. Used to validate magnetic stripe information during activation/deactivation.

dtInventory datetime: Inventory date for this card. Reflects most recent of date/time loaded or date/time assigned as inventory.

FastCard_Type

This table stores descriptions of the different types of Fastcards.

Fields nCardTypeID Number (PK): Unique ID for this Fastcard type.

Descriptive varchar[64]: Descriptive text for each card type. The valid combination of nTypeID and strName are given below:

TABLE 0-2

Valid Card Types

| Type ID | Name |
|---|---|
| 0 | Setup card |
| 1 | Valueless test card |
| 1001 | Currency-based Promotional |
| 1002 | Currency-based Gift |
| 1003 | Currency-based Standard |
| 1004 | Currency-based Sales Card |
| 2001 | Unit-based Promotional |
| 2002 | Unit-based Gift |
| 2003 | Unit-based Standard |
| 2004 | Unit-based Sales Card |
| 3001 | Skytel Card |

GlobalIDs

Stores a properly locked and extensible set of IDs for system-wide use.

nIDID int (PK): Unique ID for this ID.

nValue int: Previously allocated value for this ID. The next requested ID will be nValue+1.

strName varchar(128): User-defined name for this ID.

Do not access this table directly. Only use the stored procedure QryFCMS_GetNextGlobalID, which will ensure data integrity and prevent deadlocks.

The currently defined set of IDs are given below:

TABLE 0-3

Global ID Definitions

| nIDID | strName |
|---|---|
| 1 | PinHoldingGroup.nPinHoldingGroupID |
| 2 | Customer.nCustID |
| 3 | Merchant.nMerchantID |
| 4 | Location.nLocationID |
| 5 | Terminal.nTerminalID |
| 6 | Address.nAddressID |
| 7 | Contact.nContactID |
| 8 | PhoneNumber.nPhoneNumberID |

LegacyActivation

Logs attempted legacy activations via the web.

nID int IDENTITY (PK): Unique ID of this legacy activation attempt.

nUserID int: User attempting this activation, links to Users.nUserID.

strStartSerNum varchar(12): Starting serial number in the legacy activation range.

strEndSerNum varchar(12): Ending serial number in the legacy activation range.

dtEvent datetime: Date/time this legacy activation was attempted.

Location

This table stores information relevant to a location registered in the Fastcard system.

Fields nLocationID (PK) Number: This field contains the unique ID for this record, assigned sequentially when entered into the database.

nMerchantID (FK) Number: Links to MERCHANT.nMerchantID.

nShipAddrID (FK) Number: Shipping address for this location. Links to ADDRESS.nAddressID.

nContactID (FK) Number: Person to contact for this location. Links to CONTACT.nContactID.

Description varchar[32]: Descriptive name for this location.

bHide boolean: When 1, this entity is to be hidden on the web, but will still appear on billing reports.

dtCreated datetime: Time this entity was created in FCMS.

Merchant

This table stores information relevant to a merchant registered in the Fastcard system.

Fields nMerchantID (PK) int: This field contains the unique ID for this record, assigned sequentially when entered into the database.

Description varchar[32]: Descriptive name for this merchant.

nBillAddrID (FK) int: Billing address for this merchant. Links to ADDRESS.nAddressID.

nShipAddrID (FK) int: Shipping address for this merchant. Links to ADDRESS.nAddressID.

nContactID (FK) int: Person to contact for this merchant. Links to Contacts.nContactID.

nStatusID (FK) int: Status of this merchant. Links to MerchantStatus.nStatusID.

nTermsID (FK) int: Payment terms for this merchant. Links to MerchantTerms.nTermsID.

nParentID (PK) int: Deprecated, to be updated with nNodeType. This field contains the nMerchantID of the parent Merchant record, if any, for this Merchant. If this Merchant is the top-level Merchant in the heirarchy, then this field is 0.

nCustID (FK) int: Deprecated, will be replaced by nNodeType. DCMS customer ID of this merchant. Links to CUSTNUM.nCustID.

nNodeType int (FK): Entity node type for this merchant, either a customer or another merchant. Links to NodeTypes.nNodeTypeID.

nActionGroupID (FK) int: Activation action group for this merchant. Links to ACTION_GROUP.nGroupID.

bHide boolean: When 1, this entity is to be hidden on the web, but will still appear on billing reports.

dtCreated datetime: Time this entity was created in FCMS.

MerchantStatus

This table stores descriptions of the various Merchant status codes.

Fields nStatusID Number (PK): Unique ID for this merchant status.

strName varchar[32]: Descriptive name for this status type. The valid combinations of nStatusID and strName are given below:

TABLE 0-4

Valid Merchant Status Types

| Status ID | Name |
|---|---|
| 0 | Active |
| 1 | Hold |
| 2 | Inactive |

Other status codes are TBD.

MerchantTerms

This table stores descriptions of the various Merchant terms codes.

Fields nTermsID Number (PK): Unique ID for this merchant term code.

strName varchar[32]: Descriptive name for this terms type. The valid combinations of nTermsID and strName are given below:

TABLE 0-5

Valid Merchant Status Types

| Status ID | Name |
|---|---|
| 0 | Due upon receipt |
| 1 | ACH |
| 2 | 30-days net |

Other status codes are TBD.

NodeTypes

Defines the valid node types for the entity tree.

Fields nNodeTypeID int (PK): Unique ID for this node type strName varchar[16]: Descriptive name for this node type. Currently, only 5 node types are defined, Global, Customer, Merchant, Location, and Terminal.

PhoneNumber

This table stores telephone information that can be used to reach a contact or entity. For simplicity of design and to support any internation number format, the entire string is to be entered by the user, including any spaces, separators, and extensions.

nPhoneNumberID (PK) int: This field contains the unique ID for this record, assigned sequentially when entered into the database.

nPhoneNumberTypeID (FK) int: The type of this phone number, links to PhoneNumberType.nTypeID strPhoneNumber varchar[32]: This field contains the actual phone number data.

PhoneNumberType

This table stores the definition of phone number types.

nTypeID (PK) int: This field contains the unique ID for this record, assigned sequentially when entered into the database.

strName varchar[32]: Short name for this phone number type. Used for display purposes.

strDescription varchar[128]: Detailed description for this phone number type.

The currently defined set of phone number types are given below:

TBD

PinHolding

Defines an interim storage location for Fastcards being imported into the system.

Fields strPIN varchar[12]: DCMS pin for this card. Not used elsewhere.

strSerialNumber varchar[12] (PK): DCMS serial number for this card, to be inserted into FastCard as the serial number.

strVAN16 char[16]: 16-digit Visa Account Number, to be used as FastCard.VAN16.

nPinHoldingGroupID int (FK): ID of the pin holding group for this record, links to PinHoldingGroup.nPinHoldingGroupID.

PinHoldingGroup

Defines groups of Fastcards being imported into the system from PinHolding.

Fields nPinHoldingGroupID int (PK): ID of the pin holding group for this record, assigned uniquely when created from GlobalIDs.

nDCMSID int (FK): ID of the DCMS group targeted by these cards, links to DCMS.nDCMSID.

strDenom char[8]: 8-character denomination code for these cards.

nDenomType int: 1 for currency-based cards, 2 for unit-based cards.

PrivGroupPrivs

Defines members of a privilege group.

nPrivGroupID int (PK): Unique ID for this privilege group.

nUserPrivTypeID int (FK): ID of the privilege type for this privilege group member. Links to UserPrivTypes.nUserPrivTypeID.

Do not access this table directly. Only use the stored procedures provided for this purpose.

The currently defined set of privilege groups are given below:

TABLE 0-6

Privilege Group Definitions

| nPriv Group ID | strName |
|---|---|
| 1 | User Editor |
| 2 | Card Loader |
| 3 | In Place Card Actions |
| 4 | Remote Card Actions |
| 5 | Customer Reports |
| 6 | Merchant Reports |
| 7 | Location Reports |
| 8 | Terminal Reports |

PrivGroups
  Defines groups of related privileges.
  nPrivGroupID int (PK): Unique ID for this privilege group.
  strName varchar(32): Friendly name for this privilege group.
  Do not access this table directly. Only use the stored procedures provided for this purpose.
QueueSkytel
  Defines an action queue for Skytel operations.
Fields
  nQueueID int (PK) IDENTITY: Unique ID for this queue item.
  nCardID int (FK): Card ID of this queue item, links to Fastcard.nFastcardID.
  nNewStatus int (FK): Desired new state of this queue item, links to CardStatus.nStatusID.
    nNodeID int: Reporting root node for this queue item. Table referenced depends on the value of nNodeType.
    nNodeType int: Reporting node type for this queue item. Links to NodeTypes.nNodeTypeID.
  nUserID int (FK): User that created this queue item. Links to Users.nUserID. −1 if item was added from a transaction.
  dtQueued datetime: Date/time this item was queued.
Terminal
  This table stores information relevant to terminals belonging to merchants.
Fields
  nTerminalID Number: This field contains a unique record number, assigned sequentially when the record is created from GlobalIDs.
    nLocationID (FK) Number: Links to LOCATION.nLocationID.
    TerminalNumber varchar[16]: 16-digit terminal serial number or other identifying number of the terminal.
    strMerchantNumber CHAR[9]: This field contains the 9-digit merchant number as used in the VISA network.
    strAcqNumber CHAR[4]: This field contains the 4-digit acquirer number as used in the VISA network.
    bHide boolean: When 1, this entity is to be hidden in reports.
    dtCreated datetime: Time this entity was created in FCMS.
UserPrivs
  Defines the user privileges available to a user. If the user privilege type is present, then the user has been granted that privilege.
Fields
  nUserID int (PK,FK): Links to Users.nUserID, the ID of the user for this set of privileges.
  nUserPrivTypeID int (PK,FK): Links to UserPrivTypes.UserPrivTypeID, the ID of the type of user privilege for this privilege instance.
UserPrivTypes
  Defines the types of user privileges available to be granted.
Fields
  nUserPrivTypeID (PK): Unique ID of this user privilege.
  strName varchar(64): Short name of this user privilege.
  nSort int: Sorting order for this table when used for display. Do not use this field for any other purpose, as the values may be renormalized at any time to allow insertions into the sorting order.
  See the table UserPrivTypes for the currently defined list of privileges.
Users
  Defines the users who can access the MerchantManager system. Template users are also defined in this table, indentified by a privilege type of 0 (zero). Privileges and privilege types are defined elsewhere.
Fields
  nUserID int (PK): Unique ID of this user.
  strName char(32): User name for this user.
  strPassword char(32): Password for this user.
  dtCreated datetime: Date this user record was created.
  dtLastChanged datetime: Last date this user changed passwords. Initially NULL, resulting in an immediate update prompt the first time the user accesses the system.
  nRootNode int (FK): Root node for this user. Relevant table depends on the node type.
  nNodeType int (FK): Node type for the user, found as NodeTypes.nTypeID
  nContactID (FK) int: Contacts record containing detailed information for this login account. Links to Contacts.nContactID. The node and type identified above set the privilege for this user. The node and type identified in the EntityContact table defines the entities for which this user may also appear for administrative purposes.
WebFrame
  Defines a web-frame for targeting hyperlinks.
  nWebFrameID IDENTITY: Unique ID of this web-frame.
  strName varchar(32): Human friendly name of this frame.
  strTarget varchar(32): Target name of this frame.
  strDescription varchar(128): Descriptive text for this frame.
WebLink
  Defines web page hyperlinks.
  PK nWebLinkID IDENTITY: Unique ID for this hyperlink
  nWebPageID int: Web page on which this link resides, links to WebPage.nWebPageID.
  strName varchar(32): Human friendly name of this link.
  nWebIconID int: Icon to be used with this hyperlink. Links to WebIcon.nWebIconID.
  strText varchar(64): Text to be displayed with this hyperlink.
  nTargetFrameID int: Target frame for this hyperlink, if one exists. Links to WebFrame.nWebFrameID.
  nTargetPageID int: Target page for this hyperlink. Links to WebPage.nWebPageID.

WebPage
  Defines a web page's properties
Fields
  PK nWebPageID IDENTITY: Unique ID for this web page
  strName varchar(32): Human-friendly name of this web-page
  strFile varchar(128): Filename of this page on the site, used to generate links.
  strDescription varchar(128): Descriptive text for this web-page.
WebPageIcon
  Defines icons to be used on web-pages and links.
Fields
  PK nWebIconID IDENTITY: Unique ID for this icon.
  strName varchar(32): Human friendly name for this icon.
  strDescription varchar(32): Filename of this icon on the server.

Views

The following views are defined in Fastcard.
ViewActivityLogMellon
  This view joins the ActivityLog and ActivityLogMellon tables, and provides the following fields:
    ActivityLog.nLogID
    ActivityLog.VAN16
    ActivityLogMellon.nFileID
    ActivityLog.nRootNode
    ActivityLog.nNodeType
    ActivityLog.dtCreateDate
    ActivityLog.OpCode
    ActivityLogMellon.nTrace
    ActivityLogMellon.nReceipt
    ActivityLogMellon.strDenom
    ActivityLogMellon.strDevice
    ActivityLogMellon.strMellonCode
    ActivityLogMellon.strComment
Stored Procedures
QryCL_GetCustomerByName
  Retrieves all matching customer IDs from the DCMS/MAS90 customer codes.
Parameters
  @strName varchar[16]: DCMS/MAS90 code for the customer.
Rowset
  Normally either zero or one record(s) will be returned.
  nCustID int: All matching non-hidden Customer.nCustIDs.
Returns
  Nothing
QryCL_GetMatchingDCMS
  Retrieves all matching DCMS groups.
  @nCustID int: Customer.nCustID for the customer of interest
  @strDNIS varchar[32]: DCMS.DNIS hosting the cards
  @nGroup int: DCMS.GroupID for this group.
  @nPathID int: DCMSPath.nPathID for the group.
Rowset
  Returns all matching DCMS groups.
  nDCMSID int: DCMS.nDCMSID for the group.
  Description varchar(64): DCMS.Description for the group.
Returns
  Nothing
QryCL_GetPathByID
  Retrieves path information given the path ID.
Parameters
  @nID int: DCMSPath.nPathID for the path of interest.
Rowset
  Normally either zero or one record(s) will be returned.
  strName varchar[x]: Short name of the path
  strPath varchar[x]: Full path description
Returns
  Nothing
QryCL_ImportPinHolding
  Imports a group of PinHolding records into Fastcard. Currently does not delete the PinHolding group, but will be updated to do so on success. Imported records will be at the Customer level.
Parameters
  @nPinHoldingGroupID int: PinHolding.nPinHoldingGroupID to be imported
  @nCardType int: Fastcard.Type code to be applied to the group.
  @strExpDate char(4)='1212': Fastcard.ExpDate to be applied to the group.
Rowset
  Exactly one record will be returned
  strError varchar[x]: Descriptive error string
Returns
  -1 on failure, count of cards (including 0) imported on success
QryCL_InsertDCMS
  Creates a new DCMS record.
Parameters
  @nCustID int: Customer.nCustID for the new DCMS record
  @nGroup int: DCMS.nGroup for the new record
  @nPathID int: DCMSPath.nPathID for the new record
  @strDNIS varchar[16]: DCMS.DNIS for the new record
  @strDescription varchar[128]: DCMS.Description for the new record
Rowset
  Exactly one record will be returned
  nDCMSID int: DCMS.nDCMSID of the newly created record on success, -1 on failure.
Returns
  -1 on failure, 0 on success
QryCL_InsertPinHolding
  Creates a new PinHolding record.
Parameters
  @nPinHoldingGroupID int: PinHolding.nPinHoldingGroupID for the new record
  @strPIN varchar[16]: DCMS pin for the new record
  @strSerNum varchar[16]: DCMS serial number for the new record.
  @strVAN16 varchar[16]: VAN16 for the new record
Rowset
  Nothing
Returns
  -1 on failure, 0 on success
QryCL_InsertPinHoldingGroup
  Creates a new PinHoldingGroup record.
Parameters
  @nDCMSID int: DCMS.nDCMSID for the new record
  strDenom char[8]: FastCard.Denomination for the new record nDenomType int: 1 for currency-based cards, 2 for unit-based cards.
Rowset
  Exactly one record will be returned
  nPinHoldingGroupID int: PinHoldingGroup. nPinHoldingGroupID of the newly created record on success, −1 on failure.
Returns
  −1 on failure, 0 on success
QryFCMS_AssignCardOwner
  Assigns an owning entity to a range of Fastcards. This is an internal procedure, and does not validate the target entity against the current owning entity.
Parameters
  @strStartSerNum varchar[16]: Starting serial number for the Fastcard(s) to be assigned.
  @strEndSerNum varchar[16]: Ending serial number for the Fastcard(s) to be assigned. For single cards, set @strEndSerNum to be the same serial number assigned for @strStartSerNum.
  @nOwnerID int: The owning entity ID to which the card(s) should be assigned.
  @nOwnerType int: The owning entity type to which the card(s) should be assigned.
Rowset
  None.
Returns
  0 on success, −1 on failure.
QryFCMS_AssignSetupCard
  Validates and assigns a setup card to the indicated location.
Parameters
  @nUserID int: Users.nUserID of the user attempting this operation. This parameter is validated for having scope of the target location, scope of the card, and the privilege to assign setup cards.
  @nLocationID int: Location.nLocationID of the target location.
  @strtSerNum varchar[16]: Serial number for the Fastcard(s) to be assigned. This parameter is validated to ensure that the serial number represents a setup card.
Rowset
  strResult: String giving a textual description of the result of this operation.
Returns
  0 on success, −1 on failure.
QryFCMS_ChangePassword
  Changes the indicated user's password.
Parameters
  @nUserID int: Users.nUserID of the user attempting this operation.
  @strOldPwd varchar[16]: Old password
  @strNewPwd1 varchar[16]: First copy of the new password
  @strNewPwd2 varchar[16]: Second copy of the new password
Rowset
  strMessage: String giving a textual description of the result of this operation.
Returns
  0 on success, −1 on failure.
QryFCMS_CheckUserPrivGroup
  Verifies a user's privileges against a privilege group.
Parameters
  @nUserID int: Users.nUserID of the user attempting this operation.
  @nPrivGroupID int: ID of the privilege group of interest
  @nSilent int=0: If 0, reports the rowset, otherwise is silent.
Rowset
  nPrivTypeID int: Set of all PrivGroupPrivs.nUserPrivTypeID's assigned to the user.
Returns
  0 if the user has none of the privileges, 1 for some, and 2 for all of the privileges.
QryFCMS_CompareNodes
  Allows two nodes to be compared for scope.
Parameters
  @nRootNode1 int: Node ID of item 1
  @nNodeType1 int: Node type of item 1
  @nRootNode2 int: Node ID of item 2
  @nNodeType2 int: Node type of item 2
Rowset
  None.
Returns
  0 if Node 2 is equal to Node 1
  1 if Node 2 is below Node 1
  −1 if Node 2 is not below Node 1 or tree failed
  Gives no indication of whether Node 1 is below Node 2
QryFCMS_CompareToUser
  Allows a node to be checked against a user's scope.
Parameters
  @nUserID int: Users.nUserID of the indicated user.
  @nRootNode int: Node ID of the item to be checked
  @nNodeType int: Node type of the item to be checked
Rowset
  None.
Returns
  0 if the node is at the user's level
  1 if the node is in the user's scope
  −1 if the node is not in the user's scope
  −2 if the user does not exist
QryFCMS_CompareEntityToOldCard
  Allows any entity to be checked against a FastCard's scope. Uses the old version of the card ownership.
Parameters
  @nUserID int: Users.nUserID of the indicated user.
  @nOwnerID int: Fastcard.nOwnerID of the card of interest
  @nOwnerType int: Fastcard.nOwnerType of the card of interest
Rowset
  None.
Returns
  Returns 0 if the indicated node is equal to to the given user.
  Returns 1 if the indicated node is below the given user.
  Returns −1 if the indicated node is not below the given user or a tree failure.
  Returns −2 if the indicated user doesn't exist.
QryFCMS_CompareOldCardToUser
  Compares an old-card ownership to the indicated user.
Parameters
  @nOwnerID int: Fastcard.nOwnerID of the card of interest
  @nOwnertype int: Fastcard.nOwnerType of the card of interest
  @nEntityID int: Node ID of the item to be checked
  @nEntityType int: Node type of the item to be checked Rowset
  None.
Returns
  Returns 0 if the indicated entity is equal to to the given card owner.
  Returns 1 if the indicated entity is below the given card owner.
  Returns 1 if the indicated entity is not below the given card owner or a tree failure.
  Returns −2 if the indicated entity doesn't exist.
QryFCMS_ConfirmCardMaintActions
  Deprecated, will be removed
QryFCMS_ConfirmImportCards
  Confirmation step prior to importing cards.
Parameters
  @nUserID int: Users.nUserID of the user attempting this operation.
  @nNodeID int: Native entity table for the import operation. The target table depends on the nNodeType parameter.
  @nNodeType int: NodeTypes.nTypeID for the target of the import operation.
  @strStartSerNum varchar[12]: Starting serial number for the Fastcard(s) to be imported.
  @strEndSerNum varchar[12]: Ending serial number for the Fastcard(s) to be imported.
Rowset
  Rowset 1: Diagnostic message
    strMessage: String giving a textual description of the result of this operation.
  Rowset 2: Groups of card that will be imported and their current states. Only provided on success.
    nCount int: Count of cards for this record
    strEntity varchar[x]: Descriptive string for the entity containing this card group.
    nType int: Indicator of the status of the card group. 0 is movable, 1 is active, and 2 is an unknown unmovable condition.
Returns
  0 on success, −1 on failure.
QryFMCS_ConvertOldFastcardOwnerType
  This procedure converts the old definition of the Fastcard Owner types into the new domain.
Parameters
  @nOldOwnerType int: Fastcard.nOwnerType of the card of interest
  @nNewOwnerType int OUTPUT: Entity type of the owner.
Rowset
  None.
Returns
  Returns the same value as the @nNewOwnerType output parameter.
QryFCMS_GetCardMaintActions
  Deprecated, will be removed
QryFCMS_GetNextGlobalID
  Assigns the next available ID value from the table GlobalIDs.
Parameters
  @nIDID int: ID for the ID for which a new value is desired.
Rowset
  None.
Returns
  −1 if the ID does not exist or the transaction locking failed, or the assigned value of the ID in question if zero or higher.

QryFCMS_ImportCards
  Action step for importing cards. Call QryFCMS_ConfirmImportCards first.
Parameters
  @nUserID int: Users.nUserID of the user attempting this operation.
  @nNodeID int: Native entity table for the import operation. The target table depends on the nNodeType parameter.
  @nNodeType int: NodeTypes.nTypeID for the target of the import operation.
  @strStartSerNum varchar[12]: Starting serial number for the Fastcard(s) to be imported.
  @strEndSerNum varchar[12]: Ending serial number for the Fastcard(s) to be imported.
Rowset
  strResult: String giving a textual description of the result of this operation.
Returns
  0 on success, −1 on failure.
QryFCMS_LogonUser
  Allows a user login.
Parameters
  @strName char(20): User-supplied user name
  @strPwd char(20): User-supplied password
Rowset
  nResult int: Returns one of the following values
    −1: Logon failed. For security purposes, the exact nature of the failure is not reported.
    0: OK, nUserID is valid
    1: OK, nUserID is valid, need to update password
  nUserID int: The ID of the user in the Users table, provides security for other operations.
Returns
  Nothing
QryMellon_Auth4001
  Handles the POSA authorization transaction for a Type 4001 card (Skytel)
Parameters
  @nCardID int: Fastcard ID of the card
  @nOwnerID int: Owning entity for this card
  @nOwnerType int: Owning entity type for this card
  @strAmount1 char(8): Mellon amount code for this transaction
  @strAcqID char(4): Mellon-provided acquirer code for this transaction
  @strMerchID char(9): Mellon-provided merchant ID string for this transaction
  @strTermID char(16): Mellon-provided terminal ID string for this transaction
Rowset (as an insert into #TmpMellonAuth)
  strSerNum char(12): Fastcard serial number for this card
  nActionDCMS int: Action to be taken by the DCMS portion of the BisyncActivator. Returns 8192 on success to flag as a Skytel dispatch. Otherwise, returns 0 to indicate no DCMS action.
  strAmountDCMS char(8): DCMS amount code, returns the queue ID of the item encoded as hexadecimal.
  strGroup char(4): Always returns '0000'.
  strFilePath varchar(128): Always returns"
  nTerminalID int: Terminal.nTerminalID of the terminal if found, −1 on error strAmountMellon char(8): Returns the @strAmount parameter on success, '00000000' on error.

strCodeMellon char(3): Returns the Mellon result code specified for the entity.

strComment char(128): Comment field to be added to the activity log.

Returns
  Nothing
QryMellon_Rev4001
  Handles the POSA reversal transaction for a Type 4001 card (Skytel)
Parameters
  @nCardID int: Fastcard ID of the card
  @nOwnerID int: Owning entity for this card
  @nOwnerType int: Owning entity type for this card
  @strAmount1 char(8): Mellon amount code for this transaction
  @strAcqID char(4): Mellon-provided acquirer code for this transaction
  @strMerchID char(9): Mellon-provided merchant ID string for this transaction
  @strTermID char(16): Mellon-provided terminal ID string for this transaction
Rowset (as an insert into #TmpMellonRev)
  strSerNum char(12): Fastcard serial number for this card
  nActionDCMS int: Action to be taken by the DCMS portion of the BisyncActivator. Returns 8192 on success to flag as a Skytel dispatch. Otherwise, returns 0 to indicate no DCMS action.
  strAmountDCMS char(8): DCMS amount code, returns the queue ID of the item encoded as hexadecimal.
  strGroup char(4): Always returns '0000'.
  strFilePath varchar(128): Always returns"
  nTerminalID int: Terminal.nTerminalID of the terminal if found, −1 on error
  strComment char(128): Comment field to be added to the activity log.
Returns
  Nothing
QryMellonAuthorization
  More to come.
QryMellonReversal
  More to come.
QryMellonSetupTerminal
  More to come.
QryMellonVerifyTerminal
  More to come.
QrySkytel_AddToAuthorizationQueue
  Adds an authorization item to the Skytel queue
Parameters
  @nCardID int: Fastcard ID of the card
  @nNodeID int: Node to receive credit for this card
  @nNodeType int: Node type for this event
  @nUserID int=−1: User performing this operation. The default of −1 reflects the Mellon activator.
Rowset
  None.
Returns
  nQueueID of the newly queued item.
QrySkytel_AddToDeauthorizationQueue
  Adds a deauthorization item to the Skytel queue Parameters
  @nCardID int: Fastcard ID of the card
  @nNodeID int: Node to receive credit for this card
  @nNodeType int: Node type for this event
  @nUserID int=−1: User performing this operation. The default of −1 reflects the Mellon activator.
Rowset
  None.
Returns
  nQueueID of the newly queued item.
QrySkytel_GetCurrentQueue
  Retrieves all queued items in the Skytel queue. Used for diagnostic purposes only.
Parameters
  None
Rowset
  nQueueID int: ID of the queued item
  nCardID int: Fastcard ID of the queued item
  nNewStatusID int: New status code for this queued item
  nNodeID int: Entity to be credited with this item
  nNodeType int: Node type of the entity to be credited with this item
  nUserID int: User that queued this item
  dtQueued datetime: Time this item was queued
  strSKU varchar(?): Skytel-defined SKU for this card
  strSerial varchar(?): Skytel-defined serial for this card
  strSecurity varchar(?): Skytel-defined security code (PIN) for this card
Returns
  Nothing
QrySkytel_GetQueueItem
  Retrieves a single queued item from the Skytel queue
Parameters
  @nQueueID int: Item to retrieve
Rowset
  strSKU varchar(?): Skytel-defined SKU for this card
  strSerial varchar(?): Skytel-defined serial for this card
  strSecurity varchar(?): Skytel-defined security code (PIN) for this card
  strPartner varchar(?): Skytel-defined partner ID
  nType int: Type of this action, refer to CardStatus
Returns
  Nothing.
QrySkytel_UpdateQueue
  Updates the status of a queued item based on a connection with Skytel.
Parameters
  @nQueueID int: ID of the queued item
  @nResult int: Skytel-defined result code for this queue item
  @strError varchar(128): Skytel-defined error string for this queue item
Rowset
  None.
Returns
  Nothing.
QryUE_CheckUserName
  Used to determine whether a user name has already been used, helps prevent duplicates.
Parameters
  @strName varchar(32): Name to check
Rowset
  Nothing.

Returns
Count of all users with this name. 0 indicates the name is available.

QryUE_DeleteAllUserPrivs
Deletes all the privileges for a given user. Used by the UserEditor utility prior to inserting all current privileges.
Parameters
@nUserID int: Users.nUserID of the user for which the privileges should be deleted.
Rowset
Nothing
Returns
Nothing QryUE_GetUserPrivs
Parameters
@nUserID int: Users.nUserID of the user for which the privileges are returned.
Returns a rowset of all the currently defined privileges for a given user. Used by the UserEditor to populate a user privilege checklist.
Rowset
nUserPrivTypeID int: UserPrivTypes.nUserPrivTypeID of a privilege granted a user.
Returns
Nothing.

QryUE_InsertUser
Creates a new record in Users. Used by the User Editor to define a new user. Use QryUE_CheckUserName first to determine whether the name is available, although this does not prevent a multi-threaded race.
Parameters
@strName varchar(32): Desired user name
@strPassword varchar(32): Desired user password
@nRootID int: Root node of the user
@nRootType int: Node type of the user
Rowset
nUserID int: −1 if failed due to duplicate user (failure) or the user ID of the newly created user
Returns
Nothing.

QryUE_InsertUserPriv
Inserts a user privilege. Tolerant of duplicates.
Parameters
@nUserID int: UserPrivs.nUserID for the new privilege
@nUserPrivID int: UserPrivs.nUserPrivTypeID for the new privilege
Rowset
Nothing
Returns
Nothing xp_generatecards
Generates sets of serial numbers, VAN16s, and US South PINs. Can optionally choose to not generate either VAN16s (for IVR-only cards) or PINs (for non-US South Fastcards).
Implemented in SerNumGen.dll as an extended stored procedure. Not to be called directly by client processes, documented here only for completeness. The calling process should store the returned rowset in a temporary table for further processing.
Parameters
@nLastSerNum int OUTPUT: Upon calling, the last previously consumed 9-digit serial number used for generating cards. Upon return, contains the last serial number consumed by this procedure.
@nLastRootVAN16 int OUTPUT: Upon calling, the last previously consumed 9-digit VAN16 root (without BIN or checksum) used for generating cards. Upon return, contains the last VAN 16 root consumed by this procedure.
@nCount int: The number of cards to be generated.
@nBIN int: Six-digit integer containing the Bank Identification Number (BIN) for the group of cards to be generated.
@nMode int: Flag for the type of generation to be performed. Valid values are given below:
1—Generate serial numbers and VAN16s only. The serial numbers returned do not skip the range outside of 10 to 3009 and VAN16 roots are consumed.
2—Generate serial numbers and PINs only. The serial numbers returned skip the range outside of 10 to 3009, but the VAN16 root is not incremented.
3—Generate serial numbers, VAN16s, and PINs. The serial numbers returned skip the range outside of 10 to 3009 and VAN16 roots are consumed.
4—Generate group, ordinal, and VAN16. The serial number and PIN columns are NULL. Serial numbers are not consumed.
5—Generate group, ordinal, serial numbers and VAN16s only. The PIN column is NULL. The serial numbers returned do not skip the range outside of 10 to 3009 and VAN16 roots are consumed.
6—Generate group, ordinal, serial numbers and PINs only. The VAN16 column is NULL. The serial numbers returned skip the range outside of 10 to 3009, but the VAN16 root is not incremented.
7—Generate group, ordinal, serial numbers, VAN16s, and PINs. The serial numbers returned skip the range outside of 10 to 3009 and VAN16 roots are consumed.
@nGroup int=0: Optional parameter to specify the fixed value of the group column to be returned in modes 4 to 7.
@nOrdinal int=1: Optional parameter to specify the incremented ordinal value to be returned in modes
Rowset
nGroup int: The fixed group ID (optional)
nOrdinal int: The incremented ordinal for the card (optional)
strSerNum char(12): The serial number for the card.
strVAN16 char(16): The VAN16 for the card (optional).
strPIN char(12): The dotted PIN for the card (optional).
Returns
0 on success, −1 on failure.

xp_ConvertHexadecimal
Converts an int value to an 8-character zero-padded hexadecimal string. Used to create a DCMS code value to be returned to the transaction stream for routing to the activation dispatcher.
Implemented in UtilityFCMS.dll as an extended stored procedure.
Parameters
@nValue int: The int value to be converted.
@strHexOut char(8) OUTPUT: The zero-padded hexadecimal result.
Rowset
None
Returns
0 on success, −1 on failure.

xp_ValidateDenomination
Validates a denomination string to ensure that a user entered string is in the proper format.

Implemented in UtilityFCMS.dll as an extended stored procedure.

Parameters

@strDenom char(8) OUTPUT: The denomination string to be validated, and its result.

Rowset

None

Returns 0 on success, −1 on failure.

USER PRIVILEGE FRAMEWORK

The user privilege framework is designed to meet the following criteria:

1. Allow fine-grained access to any processes or information in the system
2. Extensible to support as-yet undefined access needs
3. Coherent editing of privileges for users or groups of users.

Relevant Database Schema

The following tables and stored procedures support the user privilege framework. Refer to the detailed descriptions in another chapter for more information concerning the individual data elements.

Tables

The following tables support the user privilege framework:

Users—This table contains the list of all users allowed access to the system

UserPrivs—This table contains the privileges assigned to a given user

UserPrivTypes—This table contains the list of all currently defined privilege types PrivGroups—This table defines related groups of privileges that can be used in concert.

PrivGroupPrivs—This table defines the privileges assigned to a privilege group.

UserGroups—This table defines groups of users that can be assigned or unassigned privileges en-masse.

UserGroupUsers—This table defines the users assigned to a given user group.

Stored Procedures

The following stored procedures support the user privilege framework:

QryUE_DeleteAllUserPrivs—Deletes all privileges for a given user.

QryUE_GetUserPrivs—Retrieves a rowset of all defined privileges for a given user.

QryUE_InsertUser—Creates a new user with no assigned privileges.

QryUE_InsertUserPriv—Assigns a privilege to a user.

QryUE_CheckUserName—Determines whether a proposed new user name is currently in use.

. . .

More to come

AUTHORIZATION RULES

This chapter gives an overview of the various messages exchanged by Mellon and US South, the states the Fastcard Activator recognizes, and the actions taken by the Activator in each state for a given message.

Mellon Messages

The Mellon messages are briefly described in this section.

In general, all Mellon messages are either network messages or financial messages. There are 8 basic message types, listed below:

Handshake, Logoff, Logon, and Key Exchange Request
Handshake, Logoff, Logon, and Key Exchange Response
Authorization Request
Authorization Response
Reversal Request
Reversal Response
Store and Forward Request
Store and Forward Response Note the pairing of Request/Response. A Response is a copy of the Request message with only a few fields changed.

Network Messages

All network messages are 60 bytes long.

Mellon defines only two network messages, as distinguished by type (Field 1). However, as each of these message types has four subtypes (Field 5), one can consider nine distinct network messages, as described below:

Handshake Request (0800/00)

Mellon periodically sends US South Handshake Requests to ensure that US South is still on-line. The following fields are of interest:

TABLE 0-1

Key Handshake Request Fields

| # | Name | Size | Offset | Remarks |
|---|------|------|--------|---------|
| 1 | Message Type | 4 | 0 | Set to "0800" to indicate an Network Request Message |
| 2 | Trace Number | 6 | 4 | Identifier assigned by Mellon. |
| 5 | Message Sub-Type | 2 | 20 | Set to "00" to indicate Handshaking. |

Handshake Response (0810/00)

US South replies to Handshake Requests by issuing Handshake Responses, which are identical to the corresponding Handshake Request except for the following fields:

TABLE 0-2

Key Handshake Response Fields

| # | Name | Size | Offset | Remarks |
|---|------|------|--------|---------|
| 1 | Message Type | 4 | 0 | Set to "0810" to indicate an Network Response Message |
| 8 | Response Code | 2 | 42 | Set to "00" to indicate an accepted handshake, or "02" if not logged on. |

Logon Request (0800/10)

Either Mellon or US South can initiate a logon by issuing the Logon Request. The following fields are of interest:

TABLE 0-3

Key Logon Request Fields

| # | Name | Size | Offset | Remarks |
|---|------|------|--------|---------|
| 1 | Message Type | 4 | 0 | Set to "0800" to indicate an Network Request Message |
| 2 | Trace Number | 6 | 4 | Identifier assigned by Mellon or US South |

TABLE 0-3-continued

Key Logon Request Fields

| # | Name | Size | Off-set | Remarks |
|---|---|---|---|---|
| 5 | Message Sub-Type | 2 | 20 | Set to "10" to indicate Logon. |

Logon Response (0810/10)

Either US South or Mellon responds to a Logon Request with a Logon Response, and a response code indicating whether the logon was accepted or rejected. The following fields apply:

TABLE 0-4

Key Logon Response Fields

| # | Name | Size | Off-set | Remarks |
|---|---|---|---|---|
| 1 | Message Type | 4 | 0 | Set to "0810" to indicate an Network Response Message |
| 8 | Response Code | 2 | 42 | Set to "00" to indicate an accepted logon, or "01" to indicate a rejected logon. |

Logoff Request (0800/20)

Either Mellon or US South can initiate a logoff by issuing the Logoff Request. The following fields are of interest:

TABLE 0-5

Key Logoff Request Fields

| # | Name | Size | Off-set | Remarks |
|---|---|---|---|---|
| 1 | Message Type | 4 | 0 | Set to "0800" to indicate an Network Request Message |
| 2 | Trace Number | 6 | 4 | Identifier assigned by Mellon or US South. |
| 5 | Message Sub-Type | 2 | 20 | Set to "20" to indicate Logoff. |

Logoff Response (0810/20)

Either US South or Mellon responds to a Logoff Request with a Logoff Response, and a response code indicating whether the logoff was accepted or rejected. The following fields apply:

TABLE 0-6

Key Logoff Response Fields

| # | Name | Size | Off-set | Remarks |
|---|---|---|---|---|
| 1 | Message Type | 4 | 0 | Set to "0810" to indicate an Network Response Message |
| 8 | Response Code | 2 | 42 | Set to "00" to indicate an accepted logoff, or "01" to indicate a rejected logoff, or "02" if not logged on. |

Request for Key Exchange (0800/30)

This message is not used by Fastcard, and will not be discussed further.

Initiate Key Exchange Request (0800/40)

This message is not used by Fastcard, and will not be discussed further.

Initiate Key Exchange Response (0810/40)

This message is not used by Fastcard, and will not be discussed further.

Financial Messages

All financial messages are 500 bytes long.

A key field of interest in the financial messages is the Track 2 Data (Field 36). This field is organized as follows, where the offset is defined as the zero-based offset from the start of the field:

TABLE 0-7

VAN16 and EXPDATE in Track 2

| Name | Size | Offset | Remarks |
|---|---|---|---|
| VAN16 | 16 | 1 | Card number |
| EXPDATE | 4 | 18 | Card expiration date, as "YYMM" |

Mellon defines seven financial messages, as distinguished by type (Field 1). These sages are described below:

Authorization Request (0200)

This message is the core of the entire Fastcard authorization system. Mellon defines a variety of authorization types, defined in the Process Code (Field 2). However, Fastcard only recognizes POS Preauthorizations (Field 2="360000").

Key fields recognized in this message are listed in the table below:

TABLE 0-8

Key Authorization Request Fields

| # | Name | Size | Off-set | Remarks |
|---|---|---|---|---|
| 1 | Message Type | 4 | 0 | Set to "0200" to indicate an Authorization Request Message |
| 2 | Process Code | 6 | 4 | Set to "360000" to indicate a POS Preauthorization. |
| 3 | Amount | 8 | 10 | Amount of the preauthorization as "$DDDDDD.CC", where the "$" and "." are implicit. Example: $10.00 is "001000". Amounts of $1.00 ("000100") are always disapproved. |
| 9 | Trace Number | 6 | 58 | This number, assigned by Mellon, is used to provide tracking for subsequent events based on this message. |
| 18 | Device Type | 2 | 101 | The only acceptable value here is "25", for POS device. |
| 20 | Acquirer FIID | 4 | 106 | The settlement entity that identifies the terminal owner. |
| 25 | Terminal ID | 16 | 175 | Unique terminal ID for a terminal owner. Typically the terminal's serial number. |
| 26 | Receipt Number | 6 | 191 | Terminal receipt number normally printed on the customer's receipt. This number is also used for tracking subsequent events. |
| 36 | Track 2 Data | 39 | 302 | This field has the VAN16 and card's expiration date embedded within it. See Table 0-7 VAN16 and EXPDATE in Track 2 for interpretation of this field. |
| 40 | Merchant ID | 9 | 353 | The merchant ID assigned by the merchant's acquirer. |

Authorization Response (0210)

US South notifies Mellon of approval or disapproval by using this message. Key fields of interest in this message are given in the following table:

TABLE 0-9

Key Authorization Response Fields

| # | Name | Size | Off-set | Remarks |
|---|---|---|---|---|
| 1 | Message Type | 4 | 0 | Set to "0210" to indicate an Authorization Response Message |
| 17 | Original Message Type | 4 | 97 | Set to "0200" to indicate that the original message was an Authorization Request |
| 19 | Response Code | 3 | 103 | Set to "501" to indicate approval, "559" to indicate disapproval. |

Reversal Request (0400)

When the customer at the terminal decides to cancel the transaction, or Mellon experienced a communications failure or delay, a Reversal Request may be received. A Reversal Request is generally a copy of the original Authorization Request message, except that the Message Type field is "0400", and indicates that the original action taken with the Authorization Request be reversed. Refer to Table 0-8 Key Authorization Request Fields for an interpretation of the fields of interest in this message.

Reversal Response (0410)

US South must respond to a Request with a Reversal Response, which is a copy of the Reversal Request with the following changes:

TABLE 0-10

Key Reversal Response Fields

| # | Name | Size | Off-set | Remarks |
|---|---|---|---|---|
| 1 | Message Type | 4 | 0 | Set to "0410" to indicate an Reversal Response Message |
| 17 | Original Message Type | 4 | 97 | Set to "0400" to indicate that the original message was an Reversal Request |

Store and Forward Request Type 0 (9220)

If the link between Mellon and US South becomes broken, messages will obviously not be exchanged. In this situation, Mellon normally buffers authorizations and reversals, using a set of rules known as "Stand-In Processing". Once the link is re-established, the accumulated authorizations and reversals will be transmitted using this message type.

However, due to the unique needs of Fastcard as opposed to normal VISA transactions, Stand-In Processing is not desired. As a result, the only Store and Forward Request Type 0 messages recognized by Fastcard are stored reversals (Field 17="0400"). These messages are interpreted identically to reversals.

Store and Forward Request Type 1 (9221)

This message is identical to the Store and Forward Request Type 0, except that it may be a duplicate of a previously received message.

Store and Forward Response (9230)

The response to a Store and Forward is simply a duplicate of the request message, except for Field 1 being set to "9230". As there is no longer any feedback to the terminal, there are no accept or decline codes defined for this message.

ACTIVATOR STATES

The US South Fastcard Activator program operates at all times in one of the four following states:

Logon: Currently processing messages. Moves to Logoff upon receipt of a Logoff Request from Mellon, or to Pending Logoff when a logoff is initiated by US South.

Logoff: Off-line, not processing messages, other than a Logon Request from Mellon. Moves to Logon upon receipt of a Logon Request from Mellon, or to Pending Logon when a logon is initiated by US South.

Pending Logoff: Currently logged on and processing, but waiting for a response to a Logoff Request issued by US South. Moves to Logoff upon receipt of a Logoff Request from Mellon, or the Logoff Response from Mellon corresponding to the previous Logoff Request from US South.

Pending Logon: Off-line, not processing messages, but waiting for a response to a Logon Request issued by US South, or a Logon Request. Moves to Logon upon receipt of a Logon Request from Mellon, or the Logon Response from Mellon corresponding to the previous Logon Request from US South.

The following diagram details these states and their transitions:

Figure 0-1 Logon/Logoff States

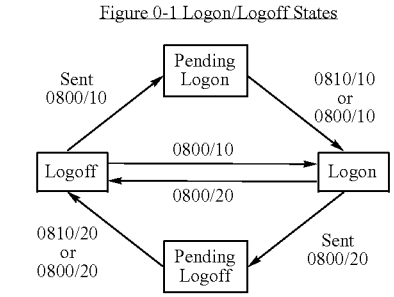

ACTIVATOR ACTIONS

In this section, the actions taken by the Activator will be detailed, organized by reaction to each incoming message type, organized by the logon state of the Activator.

Logon State Actions

In the logon state, the Activator processes all incoming messages, as follows:

Logon Request
  Responds by sending a Logon Response with the Response Code set to "00", even though US South is already logged on.

Logon Response
  Ignores this message.

Logoff Request
  Responds by sending a Logoff Response with the Response Code set to "00", and changes state to Logoff.

Logoff Response
  This message is ignored in this state.

Handshake Request
  Responds by sending a Handshake Response with the Response Code set to "00".

Authorization Request
  Performs the Authorization Process, and responds with an Authorization Response message with the Response Code set appropriately depending on the outcome of the Authorization Process.

Reversal Request
  Performs the Reversal Process, and responds with an Reversal Response message.

Store and Forward Request Type 0
If Original Message Type is not "0400", ignores this message. Otherwise, performs the Reversal Process, and responds with an Reversal Response message.
Store and Forward Request Type 1
Performs the same process as the Store and Forward Request Type 0.
Logoff State Actions
In this state, the Activator processes all incoming messages, as follows:
Logon Request
Responds by sending a Logon Response with the Response Code set to "00", and changes state to Logon.
Logon Response
This message is ignored in this state.
Logoff Request
Responds by sending a Logoff Response with the Response Code set to "00", even though the Activator is already logged off.
Logoff Response
This message is ignored in this state.
Handshake Request
Responds by sending a Handshake Response with the Response Code set to "02".
Authorization Request
This message is ignored in this state.
Reversal Request
This message is ignored in this state.
Store and Forward Request Type 0
This message is ignored in this state.
Store and Forward Request Type 1
This message is ignored in this state.
Pending Logon State Actions
In this state, the Activator processes all incoming messages, as follows:
Logon Request
Responds by sending a Logon Response with the Response Code set to "00", and changes state to Logon.
Logon Response
Changes state to Logon.
Logoff Request
Responds by sending a Logoff Response with the Response Code set to "02".
Logoff Response
This message is ignored in this state.
Handshake Request
Responds by sending a Handshake Response with the Response Code set to "02".
Authorization Request
This message is ignored in this state.
Reversal Request
This message is ignored in this state.
Store and Forward Request Type 0
This message is ignored in this state.
Store and Forward Request Type 1
This message is ignored in this state.
Pending Logoff State Actions
In this state, the Activator processes all incoming messages, as follows:
Logon Request
Responds by sending a Logon Response with the Response Code set to "00", even though US South is already logged on.
Logon Response
Ignores this message.
Logoff Request
Responds by sending a Logoff Response with the Response Code set to "00", and changes state to Logoff.
Logoff Response
Changes state to Logoff.
Handshake Request
Responds by sending a Handshake Response with the Response Code set to "00".
Authorization Request
Performs the Authorization Process, and responds with an Authorization Response message with the Response Code set appropriately depending on the outcome of the Authorization Process.
Reversal Request
Performs the Reversal Process, and responds with an Reversal Response message.
Store and Forward Request Type 0
If Original Message Type is not "0400", ignores this message. Otherwise, performs the Reversal Process, and responds with an Reversal Response message.
Store and Forward Request Type 1
Performs the same process as the Store and Forward Request Type 0.
Mellon Activator Processes
In this section, the processes performed by the Activator are discussed in detail.
Authorization Process
The Authorization Process is performed in response to Authorization Requests.
1—Extract VAN16 from the Track 2 Data field. If it represents a Setup Card, skip to the Setup Process.
2—If the Amount 1 field is for $1, reject the transaction. $1 transactions are not accepted.
3—Extract EXPDATE from the Track 2 Data field. If it does not match the FASTCARD.EXPDATE field, reject the transaction.
4—If the Process Code is not "360000", reject the transaction. Only POS Preauthorizations are accepted.
5—If the Device Type is not "25", reject the transaction. Only POS devices are allowed.
6—If the cents value of the Amount 1 field is "00", and:
  6a. If the card is a Standard card, skip to the Standard Card Activation Process.
  6b. If the card is a Promotional card, skip to the Promotional Card Activation Process.
  6c. If the card is a Gift card, skip to the Gift Card Activation Process.
7—If the cents value of the Amount 1 field is "99", and:
  7a. If the card is a Standard card, skip to the Standard Card Deactivation Process.
  7b. If the card is a Promotional card, skip to the Promotional Card Deactivation Process.
  7c. If the card is a Gift card, skip to the Gift Card Deactivation Process.
8—If the cents value of the Amount 1 field is "01", and:
  8a. If the card is a Standard card, skip to the Standard Card Refresh Process.
  8b. If the card is a Promotional card, reject the transaction. Refreshing is not yet defined for Promotional Cards.
  8c. If the card is a Gift card, reject the transaction. Refreshing is not yet defined for Gift Cards.
9—Reject all other transactions as there are no operations defined that use a cents value other than "00", "01", and "99".
Reversal Process
The Reversal Process is performed in response to Reversal Requests and Store and Forward Reversals.
1—Extract the VAN16 from the Track 2 Data field. If it represents a Setup Card, stop. Setups are not reversed.

2—If the Amount 1 field is for $1, stop.
3—Extract EXPDATE from the Track 2 Data field. If it does not match the FASTCARD.EXPDATE field, stop.
4—If the Process Code is not "360000", stop. Only POS Preauthorizations are accepted.
5—If the Device Type is not "25", stop. Only POS devices are allowed.
6—If the cents value of the Amount 1 field is "00", and:
  6a. If the card is a Standard card, skip to the Standard Card Deactivation Process.
  6b. If the card is a Promotional card, skip to the Promotional Card Deactivation Process.
  6c. If the card is a Gift card, skip to the Gift Card Deactivation Process.
7—If the cents value of the Amount 1 field is "99", and:
  7a. If the card is a Standard card, skip to the Standard Card Activation Process.
  7b. If the card is a Promotional card, skip to the Promotional Card Activation Process.
  7c. If the card is a Gift card, skip to the Gift Card Activation Process.
8—If the cents value of the Amount 1 field is "01", and:
  8a. If the card is a Standard card, skip to the Standard Card Unrefresh Process.
  8b. If the card is a Promotional card, stop. Refreshing is not yet defined for Promotional Cards.
  8c. If the card is a Gift card, stop. Refreshing is not yet defined for Gift Cards.
9—Stop for all other transactions as there are no operations defined that use a cents value other than "00", "01", and "99".

Setup Process

The Setup Process is a sub-process of the Authorization Process, performed when the VAN16 in an Authorization Request is decoded to be a setup card.
  1—Extract EXPDATE from the Track 2 Data field. If it does not match the FASTCARD.EXPDATE field, reject the transaction.
  2—If the Process Code is not "360000", reject the transaction. Only POS Preauthorizations are accepted.
  3—If the Device Type is not "25", reject the transaction. Only POS devices are allowed.
  4—If there is no related LOCATION record for this FASTCARD record, reject the transaction. This card has not been assigned to a merchant's location.
  4—If the Acquirer FIID field does not match the LOCATION.ACQNUM field, reject the transaction.
  5—If the Merchant ID field does not match the LOCATION.MERCHID field, reject the transaction.
  6—Create a matching TERMINAL record, using the Terminal ID field for the TERMINAL.TERMNUM field, and accept the transaction.

Standard Card Activation Process

This process is a sub-process of the Authorization Process, performed once the operation is decoded to be an activation for a standard product card.
  1—If the dollars portion of the Amount 1 field does not match the dollars portion of the FASTCARD.DENOM field, reject the transaction.
  2—If there is no related TERMINAL record for this FASTCARD record, reject the transaction. This card has not been assigned to a merchant, or the terminal has not been setup for this card.
  3—If there is no related LOCATION record for this FASTCARD record, reject the transaction. This card has not been assigned to a merchant.
  4—If the Acquirer FIID field does not match the LOCATION.ACQNUM field, reject the transaction.
  5—If the Merchant ID field does not match the LOCATION.MERCHID field, reject the transaction.
  6—If the Terminal ID field does not match the TERMINAL.TERMNUM field, reject the transaction.
  7—Activate the card in DCMS and accept the transaction.

Standard Card Deactivation Process

This process is a sub-process of the Authorization Process, performed once the operation is decoded to be a deactivation for a standard product card.
  1—If the dollars portion of the Amount 1 field does not match the dollars portion of the FASTCARD.DENOM field, reject the transaction.
  2—If there is no related TERMINAL record for this FASTCARD record, reject the transaction. This card has not been assigned to a merchant, or the terminal has not been setup for this card.
  3—If there is no related LOCATION record for this FASTCARD record, reject the transaction. This card has not been assigned to a merchant.
  4—If the Acquirer FIID field does not match the LOCATION.ACQNUM field, reject the transaction.
  5—If the Merchant ID field does not match the LOCATION.MERCHID field, reject the transaction.
  6—If the Terminal ID field does not match the TERMINAL.TERMNUM field, reject the transaction.
  7—Deactivate the card in DCMS and accept the transaction.

Standard Card Refresh Process

This process is a sub-process of the Authorization Process, performed once the operation is decoded to be a refresh for a standard product card.
  This process is not yet defined.

Standard Card Unrefresh Process

This process is a sup-process of the Authorization Process, performed once the operation is decoded to be an un-refresh for a standard product card.
  This process is not yet defined.

Promotional Card Activation Process

This process is a sup-process of the Authorization Process, performed once the operation is decoded to be an activation for a promotional card.
  1—If the dollars portion of the Amount 1 field does not match the dollars portion of the FASTCARD.DENOM field, reject the transaction.
  2—Activate the card in DCMS and accept the transaction.

Promotional Card Deactivation Process

This process is a sub-process of the Authorization Process, performed once the operation is decoded to be a deactivation for a promotional card.
  1—If the dollars portion of the Amount 1 field does not match the dollars portion of the FASTCARD.DENOM field, reject the transaction.
  2—Deactivate the card in DCMS and accept the transaction.

Gift Card Activation Process

This process is a sub-process of the Authorization Process, performed once the operation is decoded to be an activation for a gift card.
  This process is not yet defined.

Gift Card Deactivation Process

This process is a sub-process of the Authorization Process, performed once the operation is decoded to be a deactivation for a gift card
  This process is not yet defined. .

SCENARIOS

In this chapter, various operating scenarios are considered.

Adding a Merchant to the System

Create an ACQUIRER record if required, then a MERCHANT record.

Associating Setup Cards with a Merchant

Create a SETUPCARD record for each setup card, associating the records with the appropriate merchant.

Using a Setup Card

When a transaction arrives for a setup card, create a TERMINAL record using information found in the authorization request packet, creating the association to the appropriate merchant.

Handling a Fastcard Activation or Deactivation

When a transaction arrives for a Fastcard, validate the terminal and merchant against the information found in the authorization request packet for that card. Apply activation rules to determine whether to activate. Change the FASTCARD.STATUS flag as appropriate, and create an ACTLOG record. Activate/deactivate the card in DCMS using the DNIS field to find the proper DCMS pin file.

USE CASES

User Instance Cases

The following set of use-cases relate to manipulating user instances in the FCMS system. A User is a login account that can manipulate data and entities in FCMS.
Create A User
  This use case involves creating a new user account in the system that can then login and manipulate data items.
Edit A User
View A User
Delete A User

Customer Instance Cases
Create A Customer
Edit A Customer
View A Customer
Delete A Customer
Generate Customer Reports

Merchant Instance Cases
Create A Merchant
Edit A Merchant
View A Merchant
Delete A Merchant
Generate Merchant Reports

Location Instance Cases
Create A Location
Edit A Location
View A Location
Delete A Location
Generate Location Reports

Terminal Instance Cases
View A Terminal
Delete A Terminal
Generate Terminal Reports

Card Instance Cases
Activate a Fastcard In-Place
  In-Place Activation refers to the process of making a Fastcard active at its current host, with the activation to be reported at the level of the host.
  To access this feature, the user must be privileged to activate cards in-place. If so, the user is allowed to choose Activate Card(s) from the currently available list of actions, and must provide the following information:
  1. Starting serial number for the card range
  2. Ending serial number (optional). If omitted, then the range consists of a single card.
  The entity to which the activation will be credited is the entity hosting the card.
  When the User submits the above items, a confirmation summary is given which groups all of the Fastcards in the given serial number range by current owner, card type, activation state, and count in each group. The serial numbers for each distinct group is not included in this confirmation. For security purposes, any cards not in the User's scope are ignored for this summary, rather than an error message.
  Cards available for activation are highlighted in blue, while cards to be omitted from the activation are highlighted in red.
  To be included in an activation set, the following criteria must be met:
  1. The cards must be in the User's scope.
  2. The cards must be deactive
  3. The cards must be of a type to allow activation (i.e., not setup cards)
  Upon acceptance of the activation set, the cards are then activated, and screened individually for success. The activity log is then updated with the results of each activation, including the entity at which the cards were activated, using the stored procedures provided for this purpose.
Activate a Fastcard Remotely
  Remote Activation refers to the process of making a Fastcard active at an entity in the scope of the card's host, with the activation to be reported at the indicated entity.
  To access this feature, the user must be privileged to activate cards. If so, the user is allowed to choose Activate Card(s) from the currently available list of actions, and must provide the following information:
  1. Starting serial number for the card range
  2. Ending serial number (optional). If omitted, then the range consists of a single card.
  3. Entity on whose behalf the card is being activated, chosen from Merchants, Locations, and Terminals in the user's scope. This data element is provided by the currently navigated entity at the time the user chose to perform Card Actions.
  When the User submits the above items, a confirmation summary is given which groups all of the Fastcards in the given serial number range by current owner, card type, activation state, and count in each group. The serial numbers for each distinct group is not included in this confirmation. For security purposes, any cards not in the User's scope are ignored for this summary, rather than an error message. Cards available for activation are highlighted in blue, while cards to be omitted from the activation are highlighted in red.
  To be included in an activation set, the following criteria must be met:
  1. The cards must be in the User's scope.
  2. The cards must be in the Entity's scope.

3. The cards must be deactive
4. The cards must be of a type to allow activation (i.e., not setup cards)

Upon acceptance of the activation set, the cards are then activated, and screened individually for success. The activity log is then updated with the results of each activation, including the entity at which the cards were activated, using the stored procedures provided for this purpose.

Deactivate a Fastcard In-Place

In-Place Deactivation refers to the process of making a Fastcard deactive at the entity which most recently activated the card, with reporting to reflect the deactivation at that entity.

To access this feature, the user must be privileged to deactivate cards in-place. If so, the user is allowed to choose Deactivate Card(s) from the currently available list of actions, and must provide the following information:

1. Starting serial number for the card range
2. Ending serial number (optional). If omitted, then the range consists of a single card.

When the User submits the above items, a confirmation summary is given which groups all of the Fastcards in the given serial number range by current owner, card type, activation state, and count in each group. The serial numbers for each distinct group is not included in this confirmation. For security purposes, any cards not in the User's scope are ignored for this summary, rather than an error message. Cards available for deactivation are highlighted in blue, while cards to be omitted from the deactivation are highlighted in red.

To be included in an deactivation set, the following criteria must be met:

1. The cards must be in the User's scope.
2. The cards must be active
3. The cards must be of a type to allow deactivation (i.e., not setup cards or promo cards)

An additional criteria, that of no use in DCMS, is applied at the time each card is deactivated individually. A count of cards failing this criteria are reported after the deactivation set is accepted.

Upon acceptance of the deactivation set, the cards are then deactivated, and screened individually for success, including no use in DCMS. The activity log is then updated with the results of each deactivation, including the entity at which the cards were deactivated, using the stored procedures provided for this purpose.

Deactivate a Fastcard Remotely

Remote Deactivation refers to the process of making a Fastcard deactive at an entity in the scope of the card's host, with the deactivation to be reported at the indicated entity.

To access this feature, the user must be privileged to activate cards remotely. If so, the user is allowed to choose Deactivate Card(s) from the currently available list of actions, and must provide the following information:

1. Starting serial number for the card range
2. Ending serial number (optional). If omitted, then the range consists of a single card.
3. Entity on whose behalf the card is being activated, chosen from Merchants, Locations, and Terminals in the user's scope. This data element is provided by the currently navigated entity at the time the user chose to perform Card Actions.

When the User submits the above items, a confirmation summary is given which groups all of the Fastcards in the given serial number range by current owner, card type, activation state, and count in each group. The serial numbers for each distinct group is not included in this confirmation. For security purposes, any cards not in the User's scope are ignored for this summary, rather than an error message. Cards available for deactivation are highlighted in blue, while cards to be omitted from the deactivation are highlighted in red.

To be included in an deactivation set, the following criteria must be met:

1. The cards must be in the User's scope.
2. The entity to receive credit for this deactivation must be in the card's scope.
3. The cards must be active
4. The cards must be of a type to allow deactivation (i.e., not setup cards or promo cards)

An additional criteria, that of no use in DCMS, is applied at the time each card is deactivated individually. A count of cards failing this criteria are reported after the deactivation set is accepted.

Upon acceptance of the deactivation set, the cards are then deactivated, and screened individually for success, including no use in DCMS. The activity log is then updated with the results of each deactivation, including the entity at which the cards were deactivated, using the stored procedures provided for this purpose.

Refresh a Fastcard

To access this feature, the user must be privileged to refresh cards. If so, the user is allowed to choose Refresh Card(s) from the currently available list of actions, and must provide the following information:

1. Starting serial number for the card range
2. Ending serial number (optional). If omitted, then the range consists of a single card.
3. Entity on whose behalf the card is being refreshed, chosen from Merchants, Locations, and Terminals in the user's scope. This data element is provided by the currently navigated entity at the time the user chose to perform Card Actions.
4. Amount to be refreshed.

When the User submits the above items, a confirmation summary is given which groups all of the Fastcards in the given serial number range by current owner, card type, activation state, and count in each group. The serial numbers for each distinct group is not included in this confirmation. For security purposes, any cards not in the User's scope are ignored for this summary, rather than an error message. Cards available for refresh are highlighted in blue, while cards to be omitted from the refresh are highlighted in red.

To be included in an refresh set, the following criteria must be met:

1. The cards must be in the User's scope.
2. The cards must be active
3. The cards must be of a type to allow refresh (i.e., not promo cards)

Upon acceptance of the refresh set, the cards are then refresh, and screened individually for success. The activity log is then updated with the results of each refresh, including the entity at which the cards were refreshed, using the stored procedures provided for this purpose.

Set Card As Missing

Move Card To An Entity (Import Cards)

Inventory can be moved from one entity to another through the use of the ImportCards feature. To use this feature, the user navigates to the entity to which it is desired to associate a block of cards, and then selects Import Cards from the list of options. It is presumed for this discussion that the user's privilege to perform this operation is verified implicitly, and will not be discussed here.

As an example, assume the following entity structure:

```
User 1
    Distributor D1 (User 2) (Cards 1–5)
        Merchant M1
            Location L1
            Location L2
        Merchant M2
            Location L3
        Merchant M3
            Location L4
    Distributor D2 (Cards 6–10)
        Merchant M4
            Location L5
            Location L6
        Merchant M5 (User 3) (Cards 11–15)
            Location L7
            Location L8
        Merchant M6
            Location L9
```

Further assume that there are three users. User 1 has global scope, User 2 works at Distributor D1, and User 3 works at Merchant M5. Distributor D1 has cards 1–5 in its inventory, Distributor D2 has cards 6–10 in its inventory, and Merchant M5 has cards 11–15 in its inventory.

Any qualified user can import cards at will among any entities in their scope. Should the user enter a range of cards in which some exist outside of their scope, they will be alerted to that fact and allowed to complete the move with the exception of those cards which either do not exist or are outside their scope. For security purposes, both non-existent cards and cards beyond a user's scope will be excluded from the report. Cards which have been activated will be prevented from being moved. If these cards are in the user's scope this fact will be reported to the user in the confirmation step.

For confirmation, the web-site will present a summary page grouping the cards by ownership category and activation status. Moveable cards will be listed in blue, while previously activated cards will be listed in red. The page will contain a confirmation button and a cancel button. Upon pressing the confirmation button, a popup box will again ask for confirmation and, if approved, the changes will be performed on the database.

Each of the following examples assume the cards are owned as shown in the above diagram.

1. User 1 moves cards 1–15 to Merchant M4. Since all of these cards are in the user's scope, this move presents no problems, and all cards are moved to Merchant M4. The confirmation page tells the user that five cards belong to Distributor D1, five cards belong to Distributor D2, and five cards belong to Merchant M5.
2. User 2 moves cards 1–15 to Merchant M2. Since only cards 1–5 are in the user's scope, only these cards are presented for confirmation and ultimately moved.

Associate Setup Cards

Privileged users can associate setup cards with Locations in their scope. The user is prompted for a single card to be associated with a given Location. This information in then screened for the following:

1) The User has the privilege to associate setup cards
2) The Location is in the User's scope
3) The current owner of the setup card is in the User's scope
4) The card is a setup card.

If the above checks succeed, then the card is assigned to the indicated Location.

View Card Properties
Edit Card Properties
Transaction Operation Codes

The current list of valid transaction operation codes are given below.

TABLE 0-1

Valid Transaction Operation Codes

| OpCode | Name | Remarks |
|---|---|---|
| 1000 | Mellon Logon Accepted | US South accepted a log-on request from Mellon |
| 1001 | Mellon Logon Rejected | US South rejected a log-on request from Mellon |
| 1002 | US South Logon Accepted | Mellon accepted a log-on request from US South |
| 1003 | US South Logon Rejected | Mellon rejected a log-on request from US South |
| 1004 | Mellon Handshake Accepted | US South accepted a handshake request from Mellon |
| 1005 | Mellon Handshake Rejected | US South rejected a handshake request from Mellon |
| 1006 | US South Handshake Accepted | Mellon accepted a handshake request from US South |
| 1007 | US South Handshake Rejected | Mellon rejected a handshake request from US South |
| 1008 | Mellon Logoff Accepted | US South accepted a log-off request from Mellon |
| 1009 | Mellon Logoff Rejected | US South rejected a log-off request from Mellon |
| 1010 | US South Logoff Accepted | Mellon accepted a log-off request from US South |
| 1011 | US South Logoff Rejected | Mellon rejected a log-off request from US South |

It will be understood that the specific embodiment of the invention shown and described herein is exemplary only. Numerous variations, changes, substitutions and equivalents will now occur to those skilled in the art without departing from the spirit and scope of the present invention. Accordingly, it is intended that all subject matter described herein and shown in the accompanying drawings be regarded as illustrative only and not in a limiting sense and that the scope of the invention be solely determined by the appended claims.

What is claimed is:

1. A computerized method for managing stored-value card data over a communications network between a plurality of terminals and a central processor, each of said terminals accessible to respective users and located in a respective location generally remote relative to the central processor, the stored-value card data configured to securely process stored value cards transacted by respective users to enable charging prepaid services and/or products to a recipient of the transacted stored-value card, the method comprising:

provifing a database coupled to the central processor;

storing in the database a plurality of records comprising stored-value card data for each stored-value card;

processing respective identifiers of each terminal;

associating in each stored record the captured terminal identifiers to uniquely match a respective stored-value card and a respective terminal; and transmitting a request of stored-value card activation to the central processor from a respective requesting terminal, the central processor configured to accept said activation request based on whether the associated identifiers for the stored-value card to be activated match identifiers actually transmitted by the requesting terminal for that stored-value card and terminal, thus preventing fraud in the activation of that stored-value card.

2. The computerized method of claim 1 wherein the captured identifiers comprise a respective electronic signature for each terminal.

3. The computerized method of claim 1 further comprising storing in the database a table indicative of a set of actions that a respective user may execute from a respective terminal.

4. The computerized method of claim 3 wherein the set of actions that may be executed by the respective user corresponds to a predefined hierarchy table stored in the database for that user.

5. The computerized method of claim 4 wherein one of the actions that may be executed by the respective user comprises stored-value card inventory management within a predefined group of locations.

6. The computerized method of claim 1 wherein each record stored in the database further includes a parameter indicative of a predefined amount corresponding to the a face value of each respective stored-value card.

7. The computerized method of claim 6 wherein the request for stored-value card activation enables to associate a monetary value for the card to be activated solely based on the parameter indicative of the predefined amount for that card.

8. The computerized method of claim 1 wherein each record stored in the database further includes a parameter indicative of predefined time units corresponding to the a face value of each respective stored-value card.

9. The computerized method of claim 8 wherein the request for stored-value card activation enables to associate a unit value for the card to be activated solely based on the parameter indicative of the predefined time units for that card.

10. The computerized method of claim 1 further comprising transmitting a request for incrementing a value associated with a respective stored-value card, said request transmitted to the central processor from a respective requesting terminal, the central processor configured to accept said increment request based on whether the respective identifiers stored in the record for the stored-value card whose associated value is to be incremented match identifiers actually transmitted by the requesting terminal for that stored-value card and terminal.

11. The computerized method of claim 10 wherein the incrementing request is solely based on multiples of a parameter stored in the record of that stored-value card, said parameter corresponding to the an original face value of the stored-value card.

12. The computerized method of claim 1 further comprising transmitting a request of stored-value card deactivation to the central processor from a respective requesting terminal, the central processor configured to accept said deactivation request based on whether the respective identifiers stored in the record for the stored-value card to be deactivated match identifiers actually transmitted by the requesting terminal for that stored-value card and terminal and that no usage of the card has occurred.

13. The computerized method of claim 1 further comprising selectively encoding requests for stored-value card activation, incrementing and/or deactivating based on a table of predefined codes stored in the database, the predefined codes being associated with respective user groups or locations.

14. The method of claim 1, further comprising generating reports of transmitted requests of stored-value card activation.

15. The method of claim 1, wherein the transmitted request of stored-value card activation from the terminal is first transmitted to a host bank before the request is transmitted to the central processor.

16. The method of claim 1 wherein the stored-value card enables long distance telephone communication.

17. The method of claim 1 wherein the stored-value card enables wireless communication.

18. The method of claim 1 wherein the stored-value card enables paging communication services.

19. The method of claim 1 wherein the stored-value card enables internet-enabled communication services.

20. The method of claim 1 wherein the stored-value card enables long distance telephone communication.

21. The method of claim 1 wherein the stored-value card enables wireless web access.

22. The method of claim 1 wherein the stored-value card is a gift card.

23. The method of claim 1 wherein the stored-value card is a prepaid gas card.

24. The method of claim 1 wherein the stored-value card is a prepaid grocery card.

25. The method of claim 1 wherein the stored-value card is a prepaid entertainment card.

26. The method of claim 1 wherein the stored-value card is a customer rewards card.

27. A computer-readable medium encoded with computer program code for managing stored-value card data over a communications network between a plurality of terminals and a central processor, each of said terminals accessible to respective users and located in a respective location generally remote relative to the central processor, the stored-value card data configured to securely process stored-value cards transacted by respective users to enable charging prep aid services and/or products to a recipient of the transacted stored-value card, the program code causing a computer to execute a method comprising:

controlling a database coupled to the central processor;

storing in the database a plurality of records comprising stored-value card data for each stored-value card;

associating in each stored record respective identifiers to uniquely match a respective stored-value card and a respective terminal, wherein the associating step comprises processing an identifier that has been assigned to that location, that identifier being processed through each terminal at that location to capture a respective electronic signature of each terminal;

defining in each stored record a parameter corresponding to the face value of each respective stored-value card;

processing a request of stored-value card activation to the central processor from a respective requesting terminal, the central processor configured to accept said activation request based on whether the associated identifiers for the stored-value card to be activated match identifiers actually transmitted by the requesting terminal for that stored-value card and terminal.

28. The computer-readable medium of claim 27 further comprising storing in the database table indicative of a set of actions that a respective user may execute from a respective terminal.

29. The computer-readable medium of claim 27 wherein the set of actions that may be executed by that respective user corresponds to a predefined hierarchy table stored in the database for that user.

30. A system for managing stored-value card data over a communications network between a plurality of terminals and a central processor, each of said terminals accessible to respective users and located in a respective location generally remote relative to the central processor, the stored-value card data configured to securely process stored-value cards transacted by respective users to enable charging prep aid services and/or products to a recipient of the transacted stored-value card, the system comprising:

a database coupled to the central processor;

a storage module configured to store in the database a plurality of records comprising stored-value card data for each stored-value card;

an associating module configured to associate in each stored record respective identifiers to uniquely match a respective stored-value card and a respective terminal;

a value module configured to define in each stored record a parameter corresponding to the face value of each respective stored-value card;

a first processing module configured to process a request of stored-value card activation to the central processor from a respective requesting terminal, the central processor configured to accept said activation request based on whether the associated identifiers for the stored-value card to be activated match identifiers actually transmitted by the requesting terminal for that stored-value card and terminal, wherein the request for stored-value card activation enables to associate a value for the card to be activated solely based on the parameter corresponding to the face value for that card, and wherein the first processing module is responsive to an identifier that has been assigned to that location, the identifier being processed through each terminal at that location to capture a respective electronic signature of each terminal;

a second processing module configured to process a request for incrementing the value associated with a respective stored-value card, said request transmitted to the central processor from a respective requesting terminal, the central processor configured to accept said increment request based on whether the respective identifiers stored in the record for the stored-value card whose associated value is to be incremented match identifiers actually transmitted by the requesting terminal for that stored-value card and terminal and wherein the incrementing request is solely based on multiples of the parameter corresponding to the face value of that stored-value card.

31. A computerized method for managing stored-value card data over a communications network between a plurality of terminals and a central processor, each of said terminals accessible to respective users and located in a respective location generally remote relative to the central processor, the stored-value card data configured to securely process stored value cards transacted by respective users to enable charging prepaid services and/or products to a recipient of the transacted stored-value card, the method comprising:

providing a database coupled to the central processor;

storing in the database a plurality of records comprising stored-value card data for each stored-value card;

processing respective identifiers of each terminal;

associating in each stored record the captured terminal identifiers to uniquely match a respective stored-value card and a respective terminal; and transmitting a request of stored-value card activation to the central processor from a respective requesting terminal, the central processor configured to accept said activation request based on whether the associated identifiers for the stored-value card to be activated match identifiers actually transmitted by the requesting terminal for that stored-value card and terminal, thus preventing fraud in the activation of that stored-value card, wherein each stored-value card has a predefined value and is pre-associated with a single provider.

32. The computerized method of claim 30, wherein the predefined value is a face value of the stored-value card.

33. The computerized method of claim 31, wherein the predefined value is at least one of a time unit and an amount of currency.

* * * * *